United States Patent [19]

Velazquez

[11] Patent Number: 5,614,297
[45] Date of Patent: Mar. 25, 1997

[54] POLYOLEFIN STRETCH FILM

[75] Inventor: Alberto Velazquez, Chicago, Ill.

[73] Assignee: Viskase Corporation, Chicago, Ill.

[21] Appl. No.: 426,188

[22] Filed: Apr. 27, 1995

Related U.S. Application Data

[63] Continuation-in-part of Ser. No. 245,992, May 19, 1994, abandoned.

[51] Int. Cl.$^6$ ........................................................ B32B 7/02
[52] U.S. Cl. ........................... 428/218; 428/343; 428/516; 526/127; 526/160; 526/348.5
[58] Field of Search ...................................... 428/218, 516; 526/349, 348.5, 127, 160

[56] References Cited

U.S. PATENT DOCUMENTS

| | | | |
|---|---|---|---|
| 3,456,044 | 7/1969 | Pahlke | 264/567 |
| 4,501,780 | 2/1985 | Walters et al. | 428/34.9 |
| 4,671,987 | 6/1987 | Knott, II et al. | 428/216 |
| 4,737,391 | 4/1988 | Lustig et al. | 428/34.9 |
| 4,833,024 | 5/1989 | Mueller | 428/349 |
| 4,851,272 | 7/1989 | Knox, III et al. | 428/35.2 |
| 4,885,119 | 12/1989 | Mueller et al. | 264/471 |
| 4,891,253 | 1/1990 | Mueller | 428/35.2 |
| 4,927,708 | 5/1990 | Herran et al. | 428/332 |
| 5,006,398 | 4/1991 | Banerji | 428/220 |
| 5,019,315 | 5/1991 | Wilson | 264/173.19 |
| 5,023,143 | 6/1991 | Nelson | 428/516 |
| 5,030,506 | 7/1991 | Yamawaki et al. | 428/216 |
| 5,032,463 | 7/1991 | Smith | 428/520 |
| 5,051,481 | 9/1991 | Taka et al. | 525/240 |
| 5,059,481 | 10/1991 | Lustig et al. | 428/39.9 |
| 5,114,763 | 5/1992 | Brant et al. | 428/34.9 |
| 5,147,709 | 9/1992 | Dohrer et al. | 428/213 |
| 5,158,836 | 10/1992 | Schirmer et al. | 428/336 |
| 5,173,343 | 12/1992 | Arvedson et al. | 428/34.9 |
| 5,175,049 | 12/1992 | Huff et al. | 428/218 |
| 5,219,666 | 6/1993 | Schirmer et al. | 428/521 |
| 5,261,536 | 11/1993 | Wilson | 206/386 |

(List continued on next page.)

FOREIGN PATENT DOCUMENTS

| | | |
|---|---|---|
| 120503 | 10/1984 | European Pat. Off. . |
| 214945 | 3/1987 | European Pat. Off. . |
| 285444 | 10/1988 | European Pat. Off. . |
| 351744 | 1/1990 | European Pat. Off. . |
| 508165 | 10/1992 | European Pat. Off. . |
| 374783 | 11/1992 | European Pat. Off. . |
| 552911 | 7/1993 | European Pat. Off. . |
| 580377 | 1/1994 | European Pat. Off. ......... B32B 27/32 |
| 597502 | 5/1994 | European Pat. Off. . |
| 600425 | 6/1994 | European Pat. Off. . |
| 605952 | 7/1994 | European Pat. Off. . |
| 634443 | 1/1995 | European Pat. Off. . |
| 10639 | 1/1988 | Japan . |
| 5318682 | 12/1993 | Japan ............................ B32B 27/32 |
| 2152515 | 8/1985 | United Kingdom . |
| 2216845 | 10/1989 | United Kingdom . |
| 17944 | 11/1991 | WIPO ............................ B65H 81/00 |
| 14784 | 9/1992 | WIPO . |
| 8221 | 4/1993 | WIPO . |

(List continued on next page.)

OTHER PUBLICATIONS

"EXACT ™ Polymers for Targeted Performance in Film Packaging", 31 pages, brochure from Exxon Chemical Company, Houston Texas (1992).

"Mobay 1991 Product Chart (Polysar)", a 5 page brochure from Mobay A Bayer USA Inc. Company (Jun. 1991).

(List continued on next page.)

Primary Examiner—Leszek Kiliman
Attorney, Agent, or Firm—Cedric M. Richeson

[57] ABSTRACT

A polyolefin blown or slot cast monolayer or multilayer stretch film useful as a trayed overwrap e.g. for fresh red meat includes at least three layers in the multilayer embodiment each of which contains an ethylene alpha-olefin copolymer having a density below 0.915 g/cm$^3$ and having a melting point of at least 90° C. with at least one outer layer and preferably also the first outer layer or the core layer having a second ethylene alpha olefin copolymer having a melting point less than 80° C. blended therein.

76 Claims, 2 Drawing Sheets

U.S. PATENT DOCUMENTS

| | | | |
|---|---|---|---|
| 5,272,016 | 12/1993 | Ralph | 428/516 |
| 5,272,236 | 12/1993 | Lai et al. | 526/348.5 |
| 5,273,809 | 12/1993 | Simmons | 428/212 |
| 5,279,872 | 1/1994 | Ralph | 428/34.9 |
| 5,281,679 | 1/1994 | Jejelowo et al. | 526/114 |
| 5,283,128 | 2/1994 | Wilhoit | 428/516 |
| 5,292,560 | 3/1994 | German | 428/34.9 |
| 5,296,304 | 3/1994 | Yazaki et al. | 428/516 |
| 5,296,580 | 3/1994 | Matsunaga et al. | 528/502 B |
| 5,300,353 | 4/1994 | Yoshimura et al. | 428/213 |
| 5,322,720 | 6/1994 | McMurtrie et al. | 428/34.9 |
| 5,326,602 | 7/1994 | Rifi | 428/35.7 |
| 5,326,627 | 7/1994 | Yazaki et al. | 428/216 |
| 5,332,615 | 7/1994 | Watanabe | 428/215 |
| 5,332,616 | 7/1994 | Patrick et al. | 428/218 |
| 5,334,428 | 8/1994 | Dobreski et al. | 428/34.9 |
| 5,358,792 | 10/1994 | Mehta et al. | 428/516 |
| 5,360,648 | 11/1994 | Falla et al. | 428/35.2 |
| 5,364,486 | 11/1994 | Falla et al. | 156/308.4 |
| 5,376,439 | 12/1994 | Hodgson et al. | 428/220 |
| 5,387,470 | 2/1995 | Parnell et al. | 428/215 |
| 5,397,613 | 3/1995 | Georgelos | 428/36.7 |
| 5,397,640 | 3/1995 | Georgelos et al. | 428/349 |
| 5,399,401 | 3/1995 | Powell | 428/36.9 |
| 5,399,426 | 3/1995 | Koch et al. | 428/335 |
| 5,403,668 | 4/1995 | Wilhoit | 428/500 |
| 5,407,732 | 4/1995 | Dokurno | 428/213 |
| 5,415,905 | 5/1995 | Middlesworth et al. | 528/35.7 |
| 5,419,934 | 5/1995 | Wilson | 428/34.9 |
| 5,427,807 | 6/1995 | Chum et al. | 426/393 |
| 5,431,284 | 7/1995 | Wilson | 206/597 |

FOREIGN PATENT DOCUMENTS

| | | |
|---|---|---|
| 13143 | 7/1993 | WIPO . |
| 7954 | 4/1994 | WIPO . |
| 9060 | 4/1994 | WIPO . |
| 25271 | 11/1994 | WIPO . |
| 26816 | 11/1994 | WIPO . |
| 333 | 1/1995 | WIPO . |
| 4761 | 2/1995 | WIPO . |
| 10566 | 4/1995 | WIPO . |

OTHER PUBLICATIONS

"YUKA Wrap", a 4 page brochure from Mitsubishi Petrochemical Co. Ltd. (At least as early as 1993).

"Aliprot, The Recyclable Film", a 13 page brochure from Crocco (at least as early as (1993).

"Commerical Impact of Metallocoene Pe Grades Remains Open to Debate", *Modern Plastics*, pp. 18–19 (Nov.,1993).

"Film, Flexible PVC", *The Wiley Encyclopedia of Packaging Technology*, pp. 308–311, (John Wiley & Sons, Inc., 1986).

"Shell Pollypropylene Film Grade Resins", 11 page brochure from Shell Chemical Company (Jan. 1992).

"Duraflex Polybutylene Specialty Resins Properties Guide", a 16 page brochure by Shell Chemical Company (Apr. 1988).

POLYOLEFIN STRETCH FILM

CROSS-REFERENCE TO RELATED APPLICATIION

This application is a continuation-in-part of U.S. Ser. No. 08/245,992, filed May 19, 1994, now abandoned.

BACKGROUND OF THE INVENTION

The present invention relates to polyolefin stretch films. In particular, the present invention relates to flexible films which may be used as a substitute for poly(vinyl chloride) (PVC) flexible films.

Poly(vinyl chloride) is a thermoplastic polymer which has been used extensively for many years to form articles, containers and films for industrial, commercial and consumer applications. Plasticized poly(vinyl chloride) has been used to make flexible films (hereinafter "PVC film") which have enjoyed great commercial success in both non-food and food contact applications. In particular, PVC film is in widespread use as a food overwrap, e.g. for fresh fruits and vegetables, cheese, sandwiches, food trays and especially for fresh red meats, processed meats and poultry. PVC film is also used to package frozen foods, baked goods, fresh fish, as institutional packaging for overwrapping both food and such nonfood items as glassware and eating utensils, and as pharmaceutical packaging, pallet wrapping, and even as a laminate film for book covers. PVC film is well known for its stretchability, cling, clarity, transparency, gloss, toughness, machinability, heat sealability, resiliency and low cost. PVC film is used for packaging foods on trays in which the film overwraps the food and is generally tacked or sealed to itself at the bottom of the tray by heat. PVC film used to package items such as fresh red meat also has the high oxygen permeability needed to develop the bright red color that fresh red meat forms when contacted with oxygen. In addition, these overwrapped trays use PVC film having excellent elastic recovery from deformations such as those caused by depressing a thumb or finger against an overwrapped cut of red meat, poultry or ground meat. The properties of PVC film are typically easily modified for particular applications by adjusting the film thickness, or the type or amount of plasticizers and additives such as antifog, antiblock or slip agents.

With all of the above advantages, the search for a polyolefin based, thermoplastic, flexible film which may act as a substitute or replacement for PVC film has been difficult. No monolayer film having an equivalent or superior combination of properties has been found. Several different polyolefin stretch films have been commercialized to varying degrees of success. Multilayer polyolefin films have come the closest to achieving a combination of physical properties which approximate those of PVC films. Such polyolefin multilayer films generally sell at a premium above the price of PVC film used for similar applications. A market has developed for chlorine-free films having a combination of properties similar to PVC film and which may act as a substitute for PVC films in various applications.

There have been prior efforts to identify a polyolefin thermoplastic film having an improved combination of elongation, elastic memory, heat sealability and puncture resistance. However, most thermoplastic polyolefin film packaging materials suitable for food contact have relatively poor combinations of properties particularly with respect to elasticity or elastic memory.

Another important film property for food tray overwrap applications is low permanent deformation, which is a measure of the film's increase in length after stretching and relaxation. More particularly, the permanent deformation test used herein is derived from ASTM D-621 and measures the percent increase in length of a film sample stretched 50% and then allowed to recover for 30 seconds. Lower percentage values reflect the greater ability of a film to recover after being stretched. In tray overwrap applications, good film recovery preserves package appearance and integrity following handling abuse. Perfect elastomers would have 0% permanent deformation. Plasticized PVC has 3–5% deformation, while polyolefins such as linear low density polyethylene (LLDPE) generally have significantly higher permanent deformation, on the order of 6–15%. Thus, when a food wrapped in a poor deformation recovering material is poked by a consumer to test for freshness, the film does not immediately return to its former state and a deformed package having a depression caused by the finger poke results, which is aesthetically unpleasing.

Commercialized multilayer polyolefin stretch films are available under the trademarks Yuka Wrap from Mitsubishi and Aliprot from Crocco.

Yuka Wrap is described in four page brochure from Mitsubishi Petrochemical Co. Ltd. as an "environmentally sound/safe/non-PVC film" that has no plasticizer, yet provides ample extendibility and good restoration, a wide sealing range, well-balanced cling and slipperiness for use in high speed wrapping machines, and good optical properties.

Aliprot is described in a 13 page brochure from Crocco as "the recyclable film" which is polyolefin-based containing no chlorine and no plasticizers and which is suitable for food cling wrap applications. Aliprot film purportedly is suitable for use with automatic wrapping machines and has high puncture resistance and good printability.

Disadvantageously, both Yuka Wrap and Aliprot cling wrap films have poor elastic recovery from finger pokes when compared to PVC film.

It would be desirable to provide a multilayer, flexible, stretchable blown film having a combination of physical properties making it suitable as a substitute or replacement film for PVC film in food contact applications.

It would be advantageous for such film to be transparent, clear, have low haze and high gloss in combination with having a high degree of deformation recovery, rapid elastic recovery, good oxygen permeability which is sufficient to facilitate red bloom in fresh meat, heat sealability and good machinability.

One object of this invention is to provide an improved multilayer stretch film suitable for use as a trayed food overwrap material.

A further object is to provide such a stretch film in the form of three or more layers which has excellent puncture resistance and elastic recovery.

Another object is to provide a polyolefin-containing multiple layer stretch film having low permanent deformation.

Another object of this invention is to provide such a film which is capable of forming a sealed trayed food package as a stretch overwrap material.

Still another object is to provide such a film having high abuse resistance.

Yet another object of the invention is to provide a film which may be used on automatic packaging machinery.

A further object of the invention is to provide a film in roll form which may easily be cut for use in packaging, particularly on automated equipment.

An additional object is to provide such a film which can be heat sealed as a stretch wrap material around a food-containing tray at low temperature and energy.

A further additional object of this invention is to provide an improved heat sealed food-containing tray package overwrapped by a film having good deformation recovery.

Another additional object of the invention is to provide a chlorine free, polyolefin stretch film that is substantially free of heat shrinkage at 90° C., but having a combination of excellent extensibility, finger poke recovery, optical properties, and heat sealability.

Yet another object of this invention is to provide a film which achieves one or more of the above objects and which may be made by a blown film or slotcast process.

These and other objects and advantages may be found in various embodiments of the present invention. It is not necessary that each and every object or advantage be found in all embodiments of the present invention. It is sufficient that the present invention may be advantageously employed.

Other objects and advantages of this invention will be apparent from the ensuing disclosure and appended claims.

SUMMARY OF THE INVENTION

One aspect of this invention relates to a polyolefin, multilayer flexible film comprising at least a first outer layer, a second outer layer, and a core layer between the first and second outer layers. Preferably, the film is a slot cast film or a blown film which has at least three layers including a core layer disposed between first and second outer layers, and the film must have less than 10% unrestrained shrinkage at 90° C. in at least one direction.

The first outer layer of the inventive film comprises at least one copolymer of ethylene and at least one $C_3$–$C_8$ alpha-olefin, and this copolymer has at least 75 weight percent of its polymer units derived from ethylene. This copolymer also has a density of at least about 0.900 g/cm$^3$ and below 0.915 g/cm$^3$, and a melting point of at least 90° C.

Optionally, and preferably the first outer layer also comprises a second copolymer of ethylene and at least one $C_3$–$C_8$ alpha olefin, with this second copolymer having at least 75 wt. % (preferably at least 80 wt. %) of its polymer units derived from ethylene, and having a copolymer density less than 0.900 g/cm$^3$, and a melting point less than 80° C. More preferably, the first outer layer will also contain a third copolymer of propylene and ethylene having at least 80 wt. % of its polymer units derived from propylene.

The core layer of all inventive film comprises at least one copolymer of ethylene and at least one $C_3$–$C_8$ alpha-olefin, with the copolymer having at least 75 weight percent of its polymer units derived from ethylene. This core layer copolymer has a density of at least about 0.900 g/cm$^3$ and below 0.915 g/cm$^3$, and a melting point of at least 90° C.

The core layer may also optionally comprise a second and/or third copolymer as described above for the first outer layer. Preferably, the core layer will consist essentially of the first copolymer in combination with suitably additives such as antifog agents, slip agents, nonionic surfactants, oleamides and/or fluoroelastomers.

The second outer layer comprises a blend of first and second copolymers of ethylene and at least one $C_3$–$C_8$ alpha-olefin. The first copolymer has at least 75 weight percent of its polymer units derived from ethylene, and has a density below 0.915 g/cm$^3$, and a melting point of at least 90° C. The second copolymer of the blend has at least 75 (preferably at least 80) weight percent of its polymer units derived from ethylene, a density less than 0.900 g/cm$^3$, and a melting point less than about 80° C.

Another aspect of the invention relates to polyolefin flexible films of one or more layers having at least one layer comprising a blend of: (a) a copolymer of ethylene and at least one $C_3$–$C_8$ alpha-olefin, said copolymer (a) having at least 75 weight percent of its polymer units derived from ethylene, and said copolymer (a) having a melting point of at least 90° C. and a density of at least about 0.900 g/cm$^3$ and below 0.915 g/cms; (b) a copolymer of ethylene and at least one $C_3$–$C_8$ alpha-olefin, said copolymer (b) having at least 75 weight percent of its polymer units derived from ethylene, and said copolymer (b) having a melting point less than about 80° C. and having a density less than 0.900 g/cm$^3$ and greater than 0.860 g/cm$^3$; and (c) a copolymer of propylene and ethylene having at least 80 weight percent of its polymer units derived from propylene. This layer may be laminated with one or more other layers to form a multilayer film or it may be formed with other layers by such means as coextrusion or coating lamination using e.g., a blown film or slot cast film process. The above film could be used alone as a monolayer film e.g., as an overwrap. It may also be used in combination with other layers as a multilayer film.

Fundamental to the present invention is polyolefin film having a composition and made by a process whereby the film thus produced may be stretched taut over a trayed product (especially eg. fresh meat) heat sealed to itself and have good and rapid elastic recovery from depressions made eg. by poking a finger against the film overwrapped product. Desirably, the film will have good properties when stretch wrapped over articles without requiring a heat shrinkage operation. An especially preferred embodiment of the invention has at least three layers.

Advantageously, film of preferred embodiments of the present invention may be substantially free of chlorine, substantially free of nonpolymeric plasticizers and/or substantially free of heat shrinkage at 90° C. ($\leq 10\%$ shrinkage in both machine and transverse direction) and in an especially preferred embodiment may be essentially free of shrinkage at 90° C. (less than 5% shrinkage) in the transverse direction. Low transverse direction shrinkage is a characteristic of slot cast or blown film. Films having a composition according to the present invention and made by a blown film (single bubble) or slot cast process may have highly desirable properties including excellent recovery from finger pokes in combination with other desirable properties including those related to film optics, extensibility, strength, sealability, gas permeability, cling, machinability, a surface tension and friction. A preferred embodiment of the invention may also be easily cut preferably in the transverse direction.

Another aspect of the invention relates to a sealed food package comprising a tray with a bottom section surrounded by upwardly extending side walls, an article (especially perishable food) supported on the upper surface of the bottom section, and a stretched polyolefin film extending over each of the article, the upper edges of the side walls and at least part of the lower surface of the tray bottom section and heat sealed to itself in flattened relationship against the lower surface of the bottom section of the tray so as to form with the tray a sealed enclosure for the food. In this aspect of the invention, the improvement is a trayed article, eg. fresh meat (either cut portions or ground) covered with a polyolefin composition as a stretched film comprising a structure as further defined below. The preferred multilayer film comprises at least a first outer layer, a second outer layer and a core layer between the first and second outer layers as further described below.

DETAILED DESCRIPTION OF THE INVENTION

Figure 1:
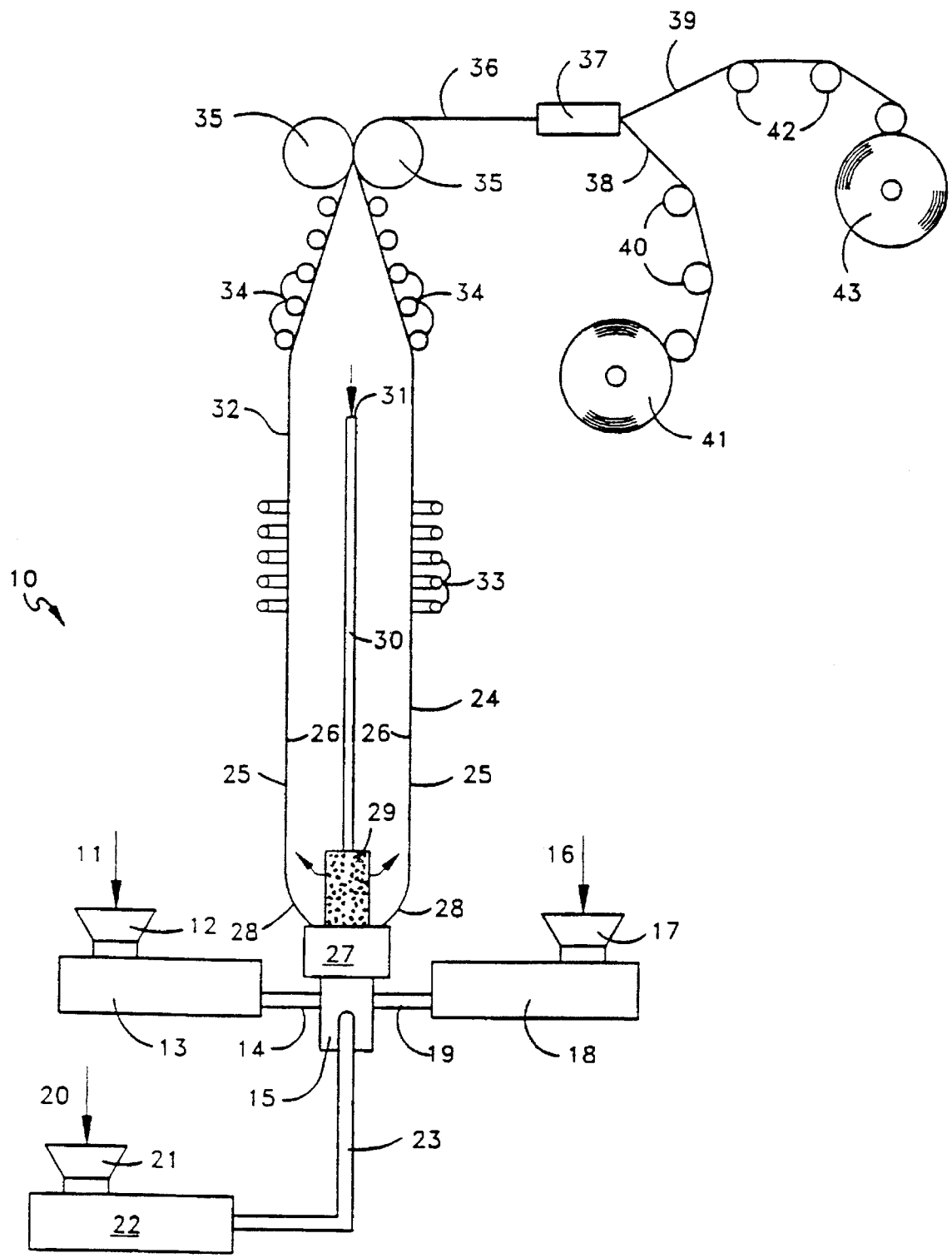
FIG. 1 is a schematic representation of a blown film process for making a thin flexible film according to the present invention.

The invention in all of its embodiments comprises or utilizes a thermoplastic polymeric flexible film of 10 mils (254 microns) or less. The invention may be used as an industrial wrap or to wrap, cover, or enclose various non-food or food articles but has particular utility as a food overwrap stretch or cling film. Such films for wrapping foodstuffs will preferably have a thickness of less than about 2 mils (50.8 microns) more preferably less than 1 mil (25.4 microns). Typically the inventive films will be between about 0.3–1.2 mil (8–30 microns). Especially preferred for use as films for packaging trayed articles including foodstuffs, e.g., fresh red meat, are films of the invention wherein the film has a thickness of between about 12 to 20 microns. Such films have good finger poke recovery, puncture resistance, and machinability. Films thinner than 10 microns are more difficult to make and handle in packaging processes without forming pin holes. Advantageously, films according to the present invention may be made thinner than 10 microns e.g., in the range of 8–10 microns for use as an overwrap by caterers or households. The inventive films may also be made in thicknesses of 12–14 microns for produce wrapping and 16–25 microns for poultry applications.

The present inventive multilayer film comprises at least three essential layers viz a first outer layer, a core layer, and a second outer layer where the core layer is between the first and second layers. The layer ratios for relative thicknesses of each of these three essential layers may vary widely. Suitable ratios of from 2:1 or lesser to 14:1 or greater may be used for either the first outer layer or the core layer thickness relative to the thickness for the individual remaining layers. For example, typically either the first outer layer will be about 12–14 times thicker than individual core and second outer layers, or the core layer will be similarly thicker relative to the individual first and second outer layers.

Individual layer thicknesses may also vary widely. Generally, the thickness of the first outer layer will be greater than any other layer. Typical preferred embodiments have a core layer thickness of from 15 to 70%. More preferably at least one of the first outer layer and core layer will comprise 50 to 70% of the total film thickness. The thickness for the core layer and the second outer layer in typical preferred embodiments ranges from 15 to 35% (more preferably 15 to 25%) of the total film thickness.

The invention also relates to polyolefin flexible single layer films as well as films having 2 or more layers. In one embodiment of the invention, a polyolefin flexible film of at least one layer comprises a blend of: (a) a copolymer of ethylene and at least one $C_3$–$C_8$ alpha-olefin, said copolymer (a) having at least 75 weight percent of its polymer units derived from ethylene, and said copolymer (a) having a melting point of at least 90° C. and a density of at least about 0.900 $g/cm^3$ and below 0.915 $g/cm^3$; (b) a copolymer of ethylene and at least one $C_3$–$C_8$ alpha-olefin, said copolymer (b) having at least 75 weight percent of its polymer units derived from ethylene, and said copolymer (b) having a melting point less than about 80° C. and having a density less than 0.900 $g/cm^3$ and greater than 0.860 $g/cm^3$; and (c) a copolymer of propylene and ethylene having at least 80 weight percent of its polymer units derived from propylene. This layer may be laminated with one or more other layers to form a multilayer film or it may be formed with other layers by such means as coextrusion or coating lamination using e.g., a blown film or slot cast film process. The above film could be used alone as a monolayer film e.g., as an overwrap. It may also be used in combination with other layers as a multilayer film. Preferably, the above blend is comprised of at least 50% by weight of component (a), at least 10% of component (b) and at least 10% of component (c). Component (a) is preferably an ethylene octene-1 copolymer. Component (b) preferably has a molecular weight distribution $\overline{M}_w/\overline{M}_n$ less than 3 and/or a melting point below 115° C. Component (c) preferably has a melting point of at least 130° C. and/or a propylene content of at least 90% by weight. Optionally, the above film layer may have blended therein from 0 to 10% by weight of an antifog agent such as a nonionic surfactant and/or from 0 to 10% by weight of a slip agent. A monolayer embodiment of the present invention has a preferred thickness of from 8 to 30 microns.

Advantageously, preferred films do not require heat shrink tunnels or apparatus for effective use. Preferred films also provide a beneficial combination of two or more or all of the following properties including low permanent deformation, low haze, high gloss, heat sealability, good elastic memory and finger poke recovery, good machinability, easy to cut (especially in transverse direction), high puncture resistance, good mechanical strength and relatively low water vapor permeability properties with desirably high gas ($O_2$ and $CO_2$) permeabilities.

The inventive film is used to cover, wrap or enclose articles including perishable products such as food and has similar optical and mechanical properties to PVC film. For storage the enclosed article may be overwrapped (with or without evacuation of air) and sealed e.g., by tacking or by a continuous hermetic seal. The sealing is typically by heat, i.e., the film has adjoining portions heated to a range between the heat seal initiation temperature and the burn-through temperature. Preferred films of the invention are food contact films suitable for wrapping meat, fruit, vegetables and for contact with food at room temperature or lower. These preferred films will have low extractable contents and meet government regulations, for extractable limits in the intended uses.

Multilayer films of the present invention are polyolefin, flexible films having at least three layers and preferably consisting essentially of three polymeric layers. Desirably, the first and second outer layers are directly adhered to opposing sides of the core layer. The three or more layers of the multilayer film may be laminated but preferably are coextruded. Each layer of the first outer layer, core layer and second outer layer utilizes at least one copolymer of ethylene and at least one $C_3$–$C_8$ alpha-olefin having a density below 0.915 $g/cm^3$ and having at least 75 wt. % and preferably at least 80 wt. % of its polymer units derived from ethylene. Advantageously, ethylenic polymer units of the ethylene alpha-olefin copolymers are nonpolar and hydrophobic which imparts moisture barrier properties to the film. Advantageously, ethylenic copolymers, in addition to polymeric units derived from ethylene monomer, will have at least about 3% by weight, preferably at least about 8% of its polymeric units derived from at least one other α-olefin monomer. Suitable α-olefin monomers include $C_3$–$C_8$ monomers. In one preferred embodiment of the invention, this other monomer comprises butene-1, hexene-1, octene-1, or a combination thereof. Preferably at least one copolymer of the film will be of ethylene and a $C_6$–$C_8$ alpha-olefin.

Such copolymer may be the same or different from layer to layer, and more than one such copolymer may be used in each layer. The necessary polymeric formulations for the required film layers are discussed in detail below. Such copolymers which are useful in the present invention include polymers known as very low density polyethylene, as well as copolymers characterized as plastomers or elastomers.

"Polyolefin" as that term is used herein refers to a hydrocarbon polymer derived from a simple olefin for example such as polyethylene or polypropylene and copolymers of such olefins. Polyolefins used in the present invention unless otherwise noted are substantially free (except for incidental amounts e.g., trace residues of catalysts or process related contaminants) of halogens, oxygen or other elements apart from carbon and hydrogen. However, these polyolefins may optionally have other polymers or substances such as processing aids, ultraviolet light stabilizers or antioxidants in admixture therewith.

The term "Polyethylene" as used herein is the name for a polymer whose basic structure is characterized by the chain ${CH_2CH_2}_n$. Polyethylene homopolymer is generally described as being a solid at room temperature which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

One form of linear polyethylene is generally referred to as high density homopolymer and has crystallinity of 70 to 90 percent with a density between about 0.96 to 0.97 g/cm$^3$. Most commercially utilized polyethylenes are not linear homopolymer but instead have $C_2$–$C_8$ alkyl groups attached to the basic chain. These substituted polyethylenes are also known as branched chain polyethylenes. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the polyethylene and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). The polyethylene industry began in the 1930's as a result of the discovery of a commercial process for producing LDPE by Imperial Chemical Industries, Ltd. researchers. LDPE is used herein to denominate branched homopolymers having densities between 0.915 and 0.930 g/cm$^3$. LDPEs typically contain long branches off the main chain (often termed "backbone") with alkyl substituents of 2 to 8 carbon atoms on these branches.

Another type of polyethylene is Linear Low Density Polyethylene (LLDPE). Only copolymers of ethylene with higher alpha-olefins are in this group. LLDPEs are presently recognized by those skilled in the art as having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range). LLDPEs typically do not have many long branches off the main chain as exhibited by LDPE. Another grouping of polyethylene is Very Low Density Polyethylene (VLDPE) which is also called "Ultra Low Density Polyethylene" (ULDPE). This grouping like LLDPEs comprise copolymers of ethylene with alpha-olefins, usually 1-butene, 1-hexene, or 1-octene and are recognized by those skilled in the art as having a high degree of linearity of structure with short branching rather than the many long side branches characteristic of LDPE. However, VLDPEs have lower densities than LLDPEs. The densities of VLDPEs are recognized by those skilled in the art to range between 0.860 and 0.915 g/cm$^3$.

The expression very low density polyethylene ("VLDPE") sometimes called ultra low density polyethylene ("ULDPE"), refers to linear polyethylenes having densities below about 0.915 g/cm$^3$, but this expression does not include ethylene alpha olefin copolymers of densities below about 0.90 g/cm$^3$ with elastomeric properties and referred to as elastomers. Some elastomers are also referred to by at least one manufacturer as "ethylene alpha olefin plastomers", but other manufacturers have characterized VLDPE as an ethylene α-olefin with plastomeric properties. VLDPE does not include linear low density polyethylenes (LLDPE) which have densities in the range of 0.915–0.930 gm/cm$^3$. VLDPE's as the term is used herein may be made by solution or fluidized bed processes using a variety of catalysts including Ziegler-Natta, metallocene, or single site constrained geometry catalysts.

VLDPE comprises copolymers (including terpolymers) of ethylene with $C_3$–$C_{10}$ (preferably $C_4$–$C_8$) alpha olefins, usually bipolymers of ethylene with 1-butene, 1-hexene or 1-octene, and in some instances terpolymers, as for example of ethylene, 1-butene and 1-hexene. A process for making VLDPEs is described in European Patent Document publication number 120,503 whose text and drawing are hereby incorporated by reference into the present document.

Some ethylene alpha-olefin copolymers are also manufactured with elastomeric properties. Some of these have densities in the same range as VLDPE's, but may have greatly different physical properties due to differences in manufacturing processes.

As used herein, ethylene alpha-olefin copolymers include bipolymers and terpolymers of ethylene and higher alpha-olefin comonomers and also include both elastomers and VLDPES.

Suitable ethylene alpha olefin copolymers (including VLDPEs) for use in forming films according to the present invention include those manufactured by Dow Chemical Company, Exxon Chemical Company, Mitsui Petrochemicals Ltd., and Union Carbide Corporation. These copolymers are commercially available in dry resin form as powder, pellets or granules.

Suitable ethylene alpha-olefin copolymers useful in the present invention include those manufactured using metallocene single site catalysts by Exxon Chemical Company of Houston, Tex. under the trademark EXACT™ such as Exact 3027, Exact 3006, and Exact 4011, and also include those manufactured using Ziegler-Natta catalysts by Dow Chemical Company of Midland, Mich. under the trademark Attane® such as Attane 4203, Attane 4201, Attane XU 61520.01 and made using metallocene or single site constrained geometry catalysts under the trademark Affinity™ such as Affinity PL 1845, Affinity PL 1840, Affinity PL 1880, and Affinity FW 1650. Reported and/or measured properties of suitable ethylene alpha olefin copolymers are presented in Table A.

having at least 75 wt. % of its polymer units derived from ethylene, and having a density less than 0.900 g/cm$^3$, and a melting point less than about 80° C. Advantageously, the first copolymer having a melting point of at least 90° C. also has an average molecular weight distribution $\overline{M}_w/\overline{M}_n$ of at least 3, and the second copolymer (having a melting point less than about 80° C. has an average $\overline{M}_w/\overline{M}_n$ less than 3.

Preferably, the first outer layer will comprise at least 40 (more preferably at least 60) weight percent of the above described first copolymer regardless of whether a second copolymer as described above is present. In one preferred embodiment, the first outer layer comprises at least 60 weight percent of the first copolymer having a melting point of at least 90° C. as described above and further comprises 40 weight percent or less of the second copolymer.

The core layer of the inventive film may in some preferred embodiments comprise at least about 70 weight percent of at least one copolymer of ethylene and at least one $C_3$–$C_8$ alpha-olefin, where the copolymer has at least 75 weight percent of its polymer units derived from ethylene, and has a density of at least about 0.900 g/cm$^3$ and below 0.915 g/cm$^3$, and a melting point of at least 90° C., and preferably between about 90° to 100° C.

In some preferred embodiments, the above copolymer(s) are present in the core layer in an amount of at least about 85 percent by weight, or optionally at least 90 percent by weight of the core layer. In an especially preferred embodiment, the core layer comprises a blend of the above described copolymer(s) with at least one of a different type of copolymer i.e., a second copolymer of ethylene and at least one $C_3$–$C_8$ alpha-olefin where this second copolymer has at least 75 weight percent of its polymer units derived from ethylene, and has a density less than 0.900 g/cm$^3$, and a melting point less than about 80° C.

TABLE A

| * | Commercial Designation | Copolymer Type | Density g/cm$^3$ | Melting Point °C. | $\overline{M}_w/\overline{M}_n$** | Vicat Softening Point °C. | Melt Index at 190° C. dg/min. |
|---|---|---|---|---|---|---|---|
| a | Exact 3027 | $C_2C_4$ | 0.900 | 92 | ~2 | 77 | 3.5 |
| b | Exact 3006 | $C_2C_4C_6$ | 0.910 | 105 | ~2 | 92 | 1.2 |
| c | Exact 4011 | $C_2C_4$ | 0.888 | 66 | ~2 | 70 | 2.2 |
| d | Attane 4203 | $C_2C_8$ | 0.905 | 107/124 | ~4 | 80 | 0.8 |
| e | Attane XU 61520.01 | $C_2C_8$ | 0.914 | 123 | ~4 | 95 | 1.0 |
| f | Affinity PL 1845 | $C_2C_8$ (9.5% $C_8$) | 0.910 | 106 | ~2 | 98 | 3.5 |
| g | Affinity PL 1840 | $C_2C_8$ (9.5% $C_8$) | 0.908 | 103 | ~2 | N.D. | 1.0 |
| h | Affinity PL 1880 | $C_2C_8$ (12.0% $C_8$) | 0.902 | 100 | ~2 | 83 | 1.0 |
| i | Affinity FW 1650 | $C_2C_8$ | 0.902 | 98 | ~2 | 83–85 | 3.0 |

*These letter designations are used to refer to these compositions in the following examples and the numbered tables. The commercial designation is believed to be the manufacturer's current commercial designation for similar polymer resins.
**Approximate reported values.
ND = Not Determined.

The first outer layer of the inventive film in a preferred embodiment is a blend of (a) a first copolymer of ethylene and at least one $C_3$–$C_8$ alpha-olefin, where the first copolymer has at least 75 weight percent of its polymer units derived from ethylene, and has a density of at least about 0.900 g/cm$^3$, and below 0.915 g/cm$^3$, and a melting point of at least 90° C., and (b) a second copolymer of ethylene and at least one $C_3$–$C_8$ alpha-olefin with the second copolymer The second outer layer of the inventive film may also be a blend, as described above for the core layer, of two different types of copolymers based upon density and/or melting point. The first and second copolymers of the second outer layer may either both have a narrow average molecular weight distribution ($\overline{M}_w/\overline{M}_n<3$), or these copolymers may have different distributions with one of the copolymers (preferably the copolymer having the higher melting point)

having an average molecular weight/distribution $\overline{M}_w/\overline{M}_n<3$ and the other copolymer having a narrow $\overline{M}_w/\overline{M}_n<3$. Preferably, the second outer layer comprises at least 70 weight percent of the first copolymer, and less than 30 weight percent of the second copolymer. In an especially preferred embodiment the second outer layer comprises between about 70 to 85 weight percent of the first copolymer and about 15 to 30 weight percent of the second copolymer. In a preferred embodiment of the invention the first copolymer of the second outer layer has a melting point between about 90 and 95° C. Also, in some embodiments, the second copolymer of the second outer layer may have a melting point which is $\geq 50°$ C. and $\leq 80°$ C.

pany of Atlanta, Ga. Shell) under the trademark Shell DS6-281 and ethylene propylene rubbers e.g. as sold by the Polysar Rubber Division of Mobay Corporation at Akron, Ohio under the trademark Polysar EPM-306 (Polysar is a trademark of Bayer AG of Germany), and also include butene ethylene copolymers sold by Shell under the trademark Duraflex® polybutylene 8640 and Duraflex™ 8310. Reported and/or measured properties of these $C_4C_2$, $C_3C_2$, or $C_2C_3$ copolymers are reported in Table B. Table B also includes properties of other polymers used in the examples including comparative examples below.

TABLE B

| * | Commercial Designation | Copolymer Type | Density g/cm³ | Melting Point °C. | Melt Index dg/min. |
|---|---|---|---|---|---|
| j | Shell DS6-D81 | $C_3C_2$ (5.5% $C_2$) | 0.900 | 135 | 4.5†† |
| k | Polysar EPM-306 | $C_2C_3$ (32% $C_3$) | 0.86 | † | † |
| m | Shell 8640 | $C_4C_2$ (<1% $C_2$) | 0.908 | 114–118 | 1.0 |
| n | Shell 8310 | $C_4C_2$ (6% $C_2$) | 0.895 | 90 | 3.0 |
| s | Exxon EVA 318.92 | EVA (9.0% VA) | 0.903 | 99 | 2.2 |
| u | Dow Primacor 1321 | EAA | 0.935 | 102 | 2.1 |

†No melting point. Reported mooney viscosity of 36 ± 6 at ML 1 + 8 (100° C.) according to ASTM D 1646 test method.
††Melt Index at condition 230° C./2.16 Kg.
*These letter designations are used to refer to these compositions in the following examples and the numbered tables. The commercial designation is believed to be the manufacturer's current commercial designation for similar polymer resins.

Advantageously, some embodiments of the invention employ a copolymer in the first outer layer which has a melting point greater than 110° C. In one embodiment believed to have superior sealing characteristics a copolymer of ethylene and at least one $C_3C_8$ alpha-olefin, having at least 75 weight percent of its polymer units derived from ethylene, and having a density of at least about 0.900 g/cm³ and below 0.915 g/cm³, and a melting point of at least 90° C. which comprises the first outer layer, has a melting point which is at least 30° C. greater than the melting point of (i) any polymer or combination of polymers in the core layer which polymer or combination of polymers comprise at least 80 weight percent of the core layer, and (ii) any polymer or combination of polymers in the second outer layer which polymer or combination of polymers comprises at least 80 weight percent of the second outer layer.

Also useful in films according to the present invention as a polymeric constituent in admixture with the aforementioned ethylene alpha-olefin copolymers are propylene-based or butene-based copolymers with ethylene or ethylene propylene rubbers (EPRs) having less than 75 wt. % ethylene. Such propylene ethylene ($C_3C_2$) copolymers or butene-1 ethylene ($C_4C_2$) copolymers have at least 50 weigh % of their polymeric units derived from either propylene or butene comonomer and have an ethylene content of less than 50 weight percent. A preferred polymer is a copolymer of propylene and ethylene having at least 80 weight percent of its polymer units derived from propylene. Such polymer is advantageously used in a blend with at least one layer, preferably the first outer layer. Beneficially such copolymer is present in an amount between about 2 to 15 weight percent of said first outer layer. An especially preferred $C_3C_2$ copolymer has a melting point of at least 130° C. in addition to having at least 80 weight percent of its polymer units derived from propylene. Examples of suitable $C_3C_2$ or $C_4C_2$ copolymers, or $C_2C_3$ rubbers include propylene- ethylene random copolymers e.g. as sold by Shell Chemical Com- The films of the present invention may also contain other polymers blended therein to modify film properties. It is contemplated that such polymers as: linear low density polyethylene (LLDPE); copolymers of ethylene and unsaturated esters such as vinyl esters e.g. ethylene vinyl acetate copolymer; ethylene alkyl acrylates such as ethylene-methylacrylate, ethylene-ethylacrylate and ethylene-butene acrylate; copolymers of ethylene and carboxylic acids such as ethylene acrylic acid copolymer (EAA); low density polyethylene (LDPE); high density polyethylene (HDPE); or ionomers may be blended into one or more of the individual layers including e.g., the first outer layer, core layer, or second outer layer of the multilayer film or may be added in optional additional layers. Preferred embodiments of the present invention have less than 20% by weight of such added nonethylene alpha-olefin copolymers. Also, any or all of the layers of the inventive films may be free of such aforementioned polymers. Inventive films which are substantially free (i.e. $\leq 5\%$ by weight of total film) from such polymers have been found to be useful and have a very desirable combination of properties without inducing disadvantageous properties or the additional trouble and expense of purchasing, storing, measuring and blending another resin and such further adjustments as would be required by addition of another resin to a film structure. Similarly, layers of the inventive film, which are substantially free (i.e., $\leq 5\%$ by weight of the total layer) from non ethylene alpha-olefin copolymers are useful.

The present invention may utilize commercially available resins. As generally recognized in the art, these resins may be melt blended or mechanically mixed by well known methods using commercially available equipment including tumblers, mixers or blenders. Also, if desired, well known additives such as processing aids, slip agents, antifog agents, cling agents, antiblocking agents, pigments, antioxidants, and mixtures thereof may be incorporated into the film, by blending prior to extrusion. Such additives are typically present in the inventive film in an amount less than 10 wt. % of the total film weight, and less than 10 wt. % for individual layers based on the individual layer weights. Preferred embodiments of the present invention suitable for stretch overwrapping refrigerated food items such as meat or cheese typically employ antifog agents, and slip agents, and commercially available polymer resins often contain either or both primary and secondary antioxidants which are added by the manufacturers (generally to inhibit degradation or crosslinking during storage and transit of the resin). Advantageously, in certain embodiments of the present invention either or both of the first outer layer and core layer comprises an antifog agent in an amount up to 4 weight percent of each layer. Certain additives which were used in the examples below are identified in Table C.

TABLE C

| * | Commercial Designation | Additive Type | General Composition |
|---|---|---|---|
| p | Atmer 8112 | Antifog agent containing additive | nonionic surfactant in LDPE base |
| q | Ampacet 50914 | slip agent containing additive | ethylene-bisoleamide in LDPE base |
| r | Ampacet 100031 | slip agent and processing aid containing additive | 1.15% oleamide and 3% fluoroelastomer in an LDPE base |
| t | Ampacet 10926 | slip agent containing additive | 2% oleamide in LDPE base |

*These letter designations are used to refer to these compositions in the following examples and the numbered tables. The commercial designation is believed to be the manufacturer's current commercial designation for similar polymer resins.

As will be explained hereinafter in more detail, the three-layer film of the present invention overcomes the aforedescribed limitations of prior polyolefin films as a PVC replacement in overwrapping trayed foods. It also performs as well as or better than many other commercially employed multilayer polyolefin films, and provides greater recovery from thumb depressions than other polyolefin films. Moreover, this three layer film has been demonstrated to provide an unexpected combination of good optical properties and low permanent deformation percentages. All of these properties are advantages in food packaging and other applications and especially for retail food packaging such as for stretch wrapping trayed fresh red meat with plastic film.

As previously noted, the multilayer inventive film comprises at least three layers. All three essential layers (i.e. the first and second outer layers and the core layer) are believed to cooperate together to provide a thermoplastic flexible film having a superior combination of optical and mechanical properties, particularly stretch properties, especially film recovery after deformation e.g. high thumb depression elastic recovery values, relative to other polyolefin type, non-PVC stretch film having less than 10% shrinkage at 90° C. in at least one direction.

Preferred films of the present invention have at least one $C_2C_8$ copolymer (preferably a substantially linear ethylene octene-1 copolymer) having at least 75 wt. % of its polymer units (more preferably at least 80%) derived from ethylene in at least one layer in an amount of at least 50 wt. % (more preferably at least 60 wt. %) of the layer. It is believed that such $C_2C_8$ copolymer adds strength to the film, particular when said $C_2C_8$ copolymer has a density of at least 0.900 g/m³ or higher.

Beneficially, films of the present invention may have a first outer layer, core layer and/or second outer layer comprising at least one copolymer of ethylene and at least one $C_3$-$C_8$ alpha-olefin, with the copolymer having at least 75 weight percent of its polymer units derived from ethylene, and having a density of at least about 0.900 g/cm³ and below 0.915 g/cm³, and a melting point of at least 90° C., and having a narrow average molecular weight distribution $\overline{M}_w/\overline{M}_n < 3$.

Preferred heat sealable films according to the present invention have at least one layer (preferably at least the first outer layer) containing a blend of broad ($\geq 3.0$) and narrow ($<3.0$) molecular weight distribution ($\overline{M}_w/\overline{M}_n$) ethylene alpha-olefin copolymers. Preferably at least 15 wt. % of a narrow molecular weight material will be blended with at least 30% and preferably from 30 to 70 wt. % of a broad molecular weight material. Such blends are believed to expand the temperature range over which heat sealing of the inventive film to itself may be accomplished. Advantageously, in some embodiments of the present invention a hot bar sealing range of at least 25° C. is obtained or preferably at least 50° C.

Advantageously, some preferred embodiments of the present invention obtain a hot bar sealing range of at least 50° C. without resort to expensive crosslinking operations e.g. by irradiation using electron beam curing units. However, if desired the film may be crosslinked to further broaden the heat sealing range.

Also, although not essential in the practice of this invention, it may be desirable to cross-link one or more layers of the inventive film for improved abuse and/or puncture resistance and other physical characteristics. This for example may be accomplished by irradiation using e.g. any electron beam generator operating in a range of about 150 kilovolts to about 6 megavolts with a power output capable of supplying the desired dosage. Many devices for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried conveniently at room temperature, although higher and lower temperatures, for example, 0° C. to 60° C. may be employed. Alternatively, crosslinking may be performed using a chemical crosslinking agent or by a combination of chemical and irradiative means. Advantageously, inventive films which are substantially uncrosslinked may be suitably made and used.

Preferably films of the present invention are blown films made by a blown film process. As the term "blown film" is used herein is meant a film produced by extruding a polymer melt from an annular die into a tube which is simultaneously pulled away from the die and over a bubble of air trapped between the die and collapsing means such as nip rolls while air is blown around the outer film tube surface to stabilize and quench the tube.

Generally, the film resins and any additives are introduced to an extruder (generally one extruder per layer) where the resins are melt plastified by heating and then transferred to an extrusion (or coextrusion) die for formation into a tube.

Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the ethylene alpha-olefin copolymer outer layer blends of the present invention, barrel and die temperatures, for example, may range between about 175° to 210° C. However, depending upon such factors as other resins which may be employed, the manufacturing process used and particular equipment and other process parameters utilized, variations are expected. Actual process parameters including process temperatures will be set by one skilled in the art without undue experimentation.

In the blown film process, contact of the outer film surface and optionally also the inner film tube surface with room temperature or cooler air cools the radially expanding tubular polymer melt as it leaves the die and travels over the trapped bubble thereby causing it to solidify. The point of transition from polymer melt to solid is commonly known as the frost line. Above the frost line, the blown or inflated tube is collapsed and fed through nip rolls which trap air within the tube to maintain an expanded bubble of fluid (typically air). Optionally, this air bubble may be used to internally cool the expanded film tube by continuously delivering cool air (e.g. at about 45°–55° F. (7°–13° C.)) while simultaneously removing warm air from inside the bubble via the die. This exchange of air is usually performed at a constant rate to produce a final blown film of uniform size. The internal bubble cooling assists in quenching the film and may also produce film having improved optical properties (i.e. lower haze and higher gloss). The blow up ratio is the ratio of the film circumference after radial expansion and cooling to the die opening circumference and may be determined from the known annular die opening dimensions and by measuring the transverse width of the flattened, expanded and cooled tubular film. Typical blow up ratios range from 2:1 to 5:1. Dimensions and properties of the blown film may be adjusted by altering the blow up ratio and/or the haul off (or draw) speed of the film as it is pulled out of the die in the machine direction e.g. by driven nip rolls.

Referring now to the drawings, FIG. 1 depicts a schematic view of a typical preferred process 10 which according to the present invention may be utilized to produce a multilayer, coextruded, blown film of the invention. In the depicted process 10 a first polyolefin polymer resin feed 11 is placed in a hopper 12 of a screw-type extruder 13 wherein it is heated to an appropriate temperature above the melting point of the first polymer feed to cause melting thereof. The extruder may also be provided with a jacketed chamber through which a cooling medium is circulating. The rotation of a screw within the extruder 13 forces melt plastified polymer through a connecting pipe 14 into a coextrusion die 15.

Simultaneous with the introduction of the melt plastified first resin feed 11 to the die 15, a second resin feed 16 (which has been placed in a hopper 17 of a second extruder 18) is similarly heat plastified and forced by extruder 18 through a pipe 19 to coextrusion die 15. A third resin feed 20 is similarly introduced to die 15 through a third hopper 21, extruder 22 and pipe 23. In a preferred embodiment of the present invention, three extruders are utilized to produce the three film layers. However, in the coextrusion art it is known that where the same polymer melt is used in more than one layer of a multilayer construction, that the melt from one extruder may be divided e.g. at the die and used for multiple layers. In this manner a tubular five layer film of the invention for example, may be made utilizing three or four extruders.

The coextrusion die 15 has an annular, preferably circular, opening and is designed to bring together the first, second and third polymer melts to form a tubular multilayer polymeric melt having a first outer layer (inner layer of the tube) comprising at least one copolymer of ethylene and at least one $C_3$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point of at least 90° C.; and a second outer layer (outermost layer of the tube) comprising a blend of (a) a first copolymer of ethylene and at least one $C_3$–$C_8$ alpha-olefin, said first copolymer having at least 75 weight percent of its polymer units derived from ethylene, and said copolymer having a density below 0.915 g/cm$^3$, and a melting point of at least 90° C., and (b) a second copolymer of ethylene and at least one $C_3$–$C_8$ alpha-olefin said second copolymer having at least 75 weight percent of its polymer units derived from ethylene, and having a density less than 0.900 g/cm$^3$, and a melting point less than about 80° C.; the first and second outer layers being separated by a core layer comprising at least one copolymer of ethylene and at least one $C_3$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point of at least 90° C.

Preferably the first outer layer also comprises a second copolymer of ethylene and at least one $C_3$–$C_8$ alpha olefin, with this second copolymer having at least 75 wt. % (preferably 80 wt. %) of its polymer units derived from ethylene, and having a copolymer density less than 0.900 g/cm$^3$, and a melting point less than 80° C. More preferably, the first outer layer will also contain a third copolymer of propylene and ethylene having at least 80 wt. % of its polymer units derived from propylene.

The multilayer melt is coextruded out of an annular die opening as a tube and the die 15 is equipped, as is known in the art, with a central orifice through which a fluid such as air is typically introduced to radially expand the diameter of the extrudate forming a blown tubular film 24 having an exterior surface 25 and interior surface 26.

The blown film tube 24 is externally cooled by cooling means such as an air ring 27 which blows cooling air along the lower outer surface 28 of the tube 24. Simultaneously, the internal surface 26 is preferably cooled e.g. by contact with refrigerated air (e.g. at 5°–15° C.) delivered through an internal bubble cooling unit having a perforated pipe 29. The perforated pipe 29 is concentrically disposed around a longer pipe 30 of narrower diameter which is open at its distal end 31 to receive and remove warmer air which has risen to an upper end 32 of the film bubble 24. The streams of external and internal cooling fluids such as air and/or water constitutes a cooling zone serving to chill or set the extruded and radially expanded plastic tube at the desired diameter.

The blown film bubble 24 is optionally stabilized by an external concentric cage 33 which helps maintain the bubble along a straight path to a collapsing ladder comprising a series of converging rolls 34. The blown bubble 24 is collapsed in rolls 34 and flattened by driven nip rolls 35 which may also serve to collapse the tube which can be reeled as a tube or slit. The stabilizing cage is particularly useful to stabilize films made using an internal bubble cooling apparatus.

For making sheet film rolls suitable for use as an overwrap to package articles such as fresh red meat and processed meats, the flattened film tube 36 is slit open into one or more sheets which may be wound on paperboard or plastic cores for subsequent dispensing or use. In the embodiment depicted in FIG. 1, the flattened tube 36 is conveyed through a slitting or cutting means such as slitter 37 where the film tube is slit by knives into two sheets 38 and 39. First multilayer sheet 38 is conveyed by rollers 40 to wind up reel 41 and second multilayer sheet 39 is conveyed by rollers 42 to wind up reel 43. Thus the film may be wound in a roll with the first outer layer comprising either the interiorly or exteriorly disposed surface of the roll.

It will be appreciated that the flat width of the sheet produced may be in a variety of sizes depending upon the circumference of the blown film and the number and placement of cuts made in the tube. Also, for production of flexible films, typical film wall thicknesses in the range of about 10 mil (254 mm) or less may be produced. Advantageously, according to the present invention, this multilayer blown film may be extruded, blown, cooled, collapsed, slit and reeled using well known and available equipment.

In the above description, reference is made to use of nip rolls which function to either or both pull or transport the tube and also to collapse an expanded tube to a flattened condition. However, it will be apparent to those skilled in the art that other transport means and collapsing means may be employed and are known in the art including such apparatus as collapsing ladders, drive belts, and the like and use of such mechanisms is contemplated by the present invention. Furthermore, it will be appreciated by those skilled in the art that such parameters as the die opening diameter, nip roll speed, amount and temperature of fluid such as air introduced and captured between the die and nip rolls, rate of flow of extrudate from the die opening, melt temperatures, type of cooling medium e.g. water or air, and internal and external bubble cooling temperatures may all be adjusted to optimize process conditions. For example, the circumference or flat width of the blown film tube may be increased to varying degrees above that of the die gap opening by modification of one or more of the above parameters. Similarly, the blown film tube may be conditioned or modified e.g. by interior, internal and/or external application and variation of the types and amounts and characteristics of materials, including gaseous or liquid fluids contacted therewith as well as setting and changing such parameters as pressures and temperatures. It will be understood in the art that such parameters may vary and will depend upon practical considerations such as the particular polymer resins comprising the tube as well as the presence or absence of modifying agents, the equipment utilized, and desired rates of production, desired tube size (including diameter and thickness), the quality and desired performance characteristics of the tubular article for the use intended. These and other process parameters including process temperatures are expected to be set by one skilled in the art without undue experimentation in view of the present disclosure.

Also, certain non-uniformities in processing, such as variation in film thickness, unequal heating or cooling of the tubing, non-uniform air flows, and the like can be obviated by rotation with or without oscillation, either alone or in combination, of the die, the air ring, or tubing winder(s) (feeler) with respect to the vertical axis of the tubing.

It should also be understood that while manufacture of blown film has been described above with respect to a coextrusion process which utilized vertical upward transport of the tube during bubble formation, that those skilled in the art may extrude the tube and form a bubble in other directions including vertically downward.

Figure 2:
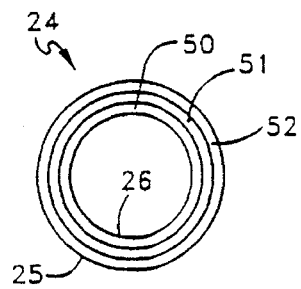
FIG. 2 is a sectional view of a tubular film made according to the process of FIG. 1.

Referring now to FIG. 2, a cross-section of the tubular blown film 24 of FIG. 1 is shown having an outer, exterior surface 25 and an inner, interior surface 26. The film 24 has three layers 50, 51 and 52 whose thicknesses are exaggerated here for clarity. A first outer layer 50 is the inner surface layer of the film tube 24 and has an interior surface 26. Disposed next to said first outer layer 50 is a core layer 51 which is preferably directly adhered by melt coextrusion to said layer 50 on one side and on the opposing side to a second outer layer 52. Second outer layer 52 is the outer surface layer of said tube 24 and has an exterior surface 25. Preferably the film of the present invention consists essentially of three layers, but additional layers may be laminated or coextruded on either side of the above three layers or interspersed between layers. A monolayer embodiment of the invention is also claimed.

Figure 3:
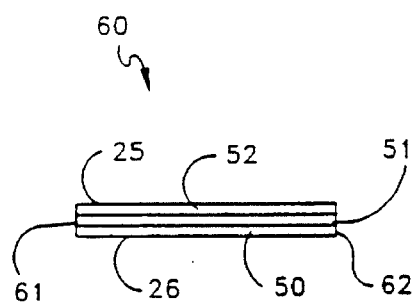
FIG. 3 is a sectional view of a sheet film according to the present invention.

Referring now to FIG. 3, a sheet 60 is shown in exaggerated cross-section. Such sheet 60 may be made by cutting open tubular film 24 of FIG. 2 forming a sheet 60 having opposing ends 61 and 62 with three layers 50, 51 and 52 which correspond to the same layers discussed above with respect to tubular film 24 in FIGS. 1 and 2. The exterior surface 25 and interior surface 26 of tube 24 are now opposing surfaces 25 and 26 of sheet 60.

Figure 4:
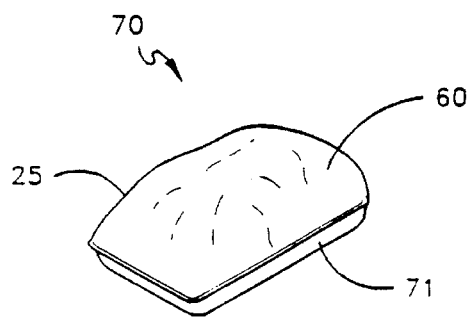
FIG. 4 is a view of a trayed article overwrapped with a multilayer film in accordance with the invention.

Referring now to FIG. 4, an overwrapped tray 70 is depicted. Film sheet 60 overwraps an article such as ground meat or a cut of meat that is placed on a tray 71. The film sheet 60 is stretched over the article and support tray 71 and the ends (not shown) of the film sheet 60 are gathered together along a bottom surface (not depicted) of the tray 71 and tacked or heat sealed together to provide a tray 70 covered by a protective stretch film 60 having an exterior film surface 25. It should be understood that in the manufacture of film sheet 60, either the inner or outer surface of the film tube 24 of FIG. 2 may be constructed to function as a food contact layer or as the exterior layer of an overwrapped article. Also, sheet 60 may be wound on a roll and portions of said sheet 60 cut off at desired lengths for use. Such rolls may contain many meters of film.

The following are examples and comparative examples given to illustrate the present invention.

Experimental results of the following examples are based on tests similar to the following test methods unless noted otherwise. All ASTM test methods noted herein are incorporated by reference into this disclosure.

Tensile Strength: ASTM D-882, method A

% Elongation: ASTM D-882, method A

1% Secant Modulus: ASTM D-882, method A

Oxygen Gas Transmission Rate ($O_2$GTR): ASTM D-3985-81 at 23° C. and 0% relative humidity Water Vapor Transmission Rate (WVTR): ASTM F-1249-90 at 38° C.

Elmendorf Tear Strength: ASTM D-1992

Gauge: ASTM D-2103

Haze: ASTM D-1003-52

Gloss: ASTM D-2457, 45° C. Angle

Melting Point: ASTM D-3418, DSC with

5° C./minute heating rate

Melt Index: ASTM D-1238, Condition E

Molecular Weight Distribution: ASTM D-3593

Vicar Softening Point: ASTM D-1525-82

Shrinkage Values: Shrinkage values are defined to be values obtained by measuring restrained shrink at 90° C. for five seconds. Four test specimens are cut from a given sample of the film to be tested. The specimens are cut into square of 10 cm length in the machine direction by 10 cm. length in the transverse direction. Each specimen is completely immersed for 5 seconds in a 90° C. water bath. The specimen is then removed from the water bath and the distance between the ends of the shrunken specimen is measured for both the M.D. and T.D. directions. The difference in the measured distance for the shrunken specimen and the original 10 cm. side is multiplied by 10 to obtain the percent of shrinkage for the specimen in each direction. The shrinkage for the four specimens is averaged for the MD shrinkage value of the given film sample, and the shrinkage for the four specimens is averaged for the TD shrinkage value.

Elastic Recovery (Thumb Depression)

A rigid hollow paperboard circular cylinder having an inner diameter of 7.5 cm, an outer diameter of 9.4 cm, a thickness of 0.95 cm, and a depth of 1.5 cm is overwrapped with a test film. The test film is placed over one of two opposing, parallel, planar, circular surfaces (faces) of the cylinder and manually pulled taut about the radial edge of the cylinder face with the minimum force necessary to produce a smooth planar surface and the film is secured to the outer cylinder wall by adhesive tape applied around the outer cylinder surface.

The overwrapped cylinder is placed on a flat, smooth rigid surface of a table so that the open face of the cylinder is against the table and the opposing film covered face is above the table. The center part of the portion of the test film which is held in the plane of the circular face of the cylinder is quickly pushed perpendicular to the cylinder face into the interior of the cylinder 1.5 cm by a thumb until the thumb firmly presses against the table surface with only the stretched film interposed therebetween. The thumb is then quickly removed from contact with the film and the degree of elastic recovery of the film to its former planar state is evaluated one minute after removal of the deforming force and assigned a number form 0.0 to 5.0.

An assigned value of 0.0 indicates a film having total deformation with no recovery after one minute from removal of the depressing thumb force. An assigned value of 5.0 indicates a film having a complete recovery similar to that of a commercially available PVC film sold for use as a fresh red meat stretch wrap. Assignment of numbers between 0.0 and 5.0 reflect the rate of recovery, with faster recovery times having higher numbers. All evaluations are made by an observer relative to a control film of plasticized PVC.

Permanent Deformation

The procedure used in the following examples for measuring permanent deformation was derived from ASTM D621 and employs an Instron table model tensile testing machine or equivalent. Four samples are tested for MD permanent deformation, and each cut to 5 inches MD length and 1 inch TD length. Likewise, four samples are tested for TD permanent deformation and each cut to 5 inches TD length and 1 inch MD length. The chart speed for both the A and B jaws is set at 20 inches/minute. The A jaws crosshead speed is set at 2 inches/minute and the B jaw crosshead speed is set at 20 inches/minute. The chart pen settings are adjusted so that the crosshead will return to gauge length of 2 inches after stretching the film 50% of its initial length, i.e. 1 inch. The B jaw speed of 20 inches/minute is run and the cross heat returns to its original position after the 50% stretch. This original position is maintained for 30 seconds. Then the jaw speed of 2 inches/minute is run in like manner. When force begins to reappear on the chart, the crosshead is returned to the initial gauge length. The chart is read in inches, from the beginning of the test to where force reappears, i.e. the pen leaves the baseline.

The percent permanent deformation is obtained by multiplying the inches on the chart by 5. The procedure is repeated with the remaining samples, and an arithmetic average is calculated. The procedure is otherwise identical to ASTM 621.

Hot Bar Sealing Range.

The hot bar sealing range test determines the acceptable temperature ranges for heat sealing plastic films using a thermal bar heat sealer. A Sencorp Systems Model 24-AS laboratory sealer manufactured by Sencorp Systems, Inc. Hyannis, Mass., U.S.A. was used. The thermal bar heat sealer is equipped with an upper ¼ inch wide sealing bar which may be heated to variably controlled temperatures. In this test, two one inch wide and four inch long (long in the TD direction) samples are cut from a tubular film. The thermal bar heat sealer is equipped with controls for temperature, time, and seal bar pressure. These controls except for temperature are set at the following conditions:

1.0 seconds dwell time (time that the upper heated jaw is held against the lower one inch (2.54 cm) wide and ⅜ inch thick fixed platen made of silicone rubber)

50 psi (345 kPa) jaw pressure

The two film samples are held together with the first outer surfaces of each film in contact with each other for use in determining the minimum sealing temperature. The two samples are held together and placed between the upper jaw and lower sealing platen of the sealer. The upper jaw and lower platen have glass fiber reinforced covers which are coated with a high temperature resistant, non-stick coating of a fluorocarbon polymer. By trial and error the minimum temperature to seal the two film portions to each other was determined by pressing the jaw against the platen at the prescribed pressure for the indicated time using various temperature settings.

The maximum temperature was then determined for a similar film sample having two film portions in first outer layer to first outer layer contact by placing the adjoining film portions between the covered sealer jaw and platen, and then closing the upper seal bar down on the lower platen. The film sample is observed after trial and error applications of higher temperatures and the temperature which does not cause a break in the seal, burn-through, or significant distortion of the seal is determined. The maximum temperature is the last noted temperature obtained before observing a break in the seal integrity.

Molecular Weight/Size Distribution

Ethylene alpha-olefin copolymers may be partially characterized by their weight average molecular weight ($\overline{M}_w$) which is determined by multiplying the weight of each chain of a given number of repeat units by the number of such chains and dividing by the total weight of chains. Ethylene alpha-olefin copolymers may also be partially characterized by a number average molecular weight ($\overline{M}_n$), which is derived from the total weight of polymer molecules divided by the total number. When both of these are known, they can be used to characterize the shape of the molecular weight distribution curve for the copolymer, i.e., the number of polymer chains in a molecular weight interval as the ordinate and the molecular weight as the abscissa. Qualitatively, a high $\overline{M}_w/\overline{M}_n$ connotes a wide distribution of molecular weights whereas a low $\overline{M}_w/\overline{M}_n$ connotes a narrow distribution. $\overline{M}_w/\overline{M}_n$ can be measured by several different techniques, but as used herein the gel permeation chromatography ("GPC") procedure outlined in ASTM D-3593-80 is used.

In general, relatively narrow $M_w/M_n$ distribution (and low ratio) permits sharper control of physical properties and superior optical properties, i.e. relatively high gloss and low haze. However, relatively low $\overline{M}_w/\overline{M}_n$ ratio value polymers are also difficult to process and have a narrow heat sealing range. More particularly, certain specific ethylene alpha-olefin copolymers known to applicant as useful in this invention, particularly with respect to film recovery properties, are characterized by relatively narrow molecular weight distribution and $\overline{M}_w/\overline{M}_n$ values below about 3.0.

Relatively broad ($\geq 3.0$)$\overline{M}_w/\overline{M}_n$ distribution, i.e. high ratio, ethylene alpha-olefin copolymers generally have better processing characteristics and a broader heat sealing range. These broad distribution materials are also preferably used in the invention in combination with the narrow molecular weight materials. Unless otherwise indicated, average molecular weight values $\overline{M}_w$, $\overline{M}_n$, $\overline{M}_z$ are reported values and may be measured by a gel permeation chromatography method similar to that of ASTM D-3593-80.

In all of the following examples, unless otherwise indicated herein, the film compositions were produced generally utilizing typical blown film manufacturing apparatus and methods as further described in the detailed description above and with respect to the drawings and the first outer layer was the inner surface layer of the film if made by the above described tubular process. The polymers and additives used were those described in Tables A–C. All percentages are by weight unless indicated otherwise.

EXAMPLES 1–5

Examples 1–3 are comparative examples (not of the invention). Example 1 is a commercially available plasticized poly(vinyl chloride) blown film sold by the Filmco Industries subsidiary of Viskase Corporation under the trademark Hi Y Gold. This film contains about 65–70 wt. % poly(vinyl chloride) plasticized with about 25–30% by weight plasticizer and has less than about 5 wt. % of other additives. Such film is used to package various articles including fresh and processed meats. Example 2 is a polyolefin stretch film commercially available under the trademark YUKA Wrap from Mitsubishi Petrochemical Co., Ltd. The film of Example 2 is believed to be a three layer film having an EVA-polybutylene blend core layer sandwiched between first and second outer layers comprising EVA. Example 3 is a polyolefin stretch film that is commercially available under the trademark Aliprot from Crocco. The film of Example 3 is believed to be a three layer film comprising an ethylene α-olefin copolymer core layer sandwiched between first and second outer layers of EVA.

Examples 4 and 5 are polyolefin multilayer films of the present invention. The film of Example 5 has an identical composition to that of Example 4 except that the layer thickness ratio is different. The coextruded film of Example 4 had a first outer:core:second outer layer thickness ratio of 50:25:25, whereas the layer ratio for Example 5 was 70:15:15. The films of Examples 4 and 5 each had a core layer sandwiched between first and second outer layers. Each first outer layer comprised a blend of two polymers with 4 wt. % of an antifog agent. The first polymer is an ethylene octene-1 ($C_2C_8$) copolymer having at least 75 wt. % of its polymer units derived from ethylene and having a melting point of at least 90° C. and a density of at least 0.900 g/cm$^3$ and below 0.915 g/cm$^3$. The first copolymer used in the first outer layer of Examples 4 and 5 was commercially available under the trademark designation DOW XU 61520.01 from Dow Chemical Company (Dow) of Midland, Mich., U.S.A. and is similar to another product sold by Dow under the trademark Attane 4201 except that XU 61520.01 has no added secondary antioxidant. The XU 61520.01 polymer, which does contain primary antioxidant, has been reported to have the properties listed in Table A. The second polymer present in the first outer layer was a copolymer of ethylene and butene-1 ($C_2C_4$) having at least 75 wt. % its polymer units derived from ethylene, a density less than 0.900 g/cm$^3$ and a melting point less than 80° C. This second polymer is commercially available under the trademark Exact™ 4011 from Exxon Chemical Co. (Exxon) of Houston, Tex., U.S.A. The Exact 4011 copolymer has been reported to have the properties listed in Table A. The first outer layer of Examples 4 and 5 is a blend of 66 wt. % XU 61520.01 ($C_2C_8$) copolymer with 30 wt. % Exact 4011 ($C_2C_4$) copolymer and 4% of an antifog agent-containing additive sold by the ICI Specialty Chemicals unit of ICI America Inc. of Wilmington, Del. under the trademark Atmer® 8112. This additive is believed to contain up to about 20 wt. % of a nonionic surfactant in an LDPE base. Thus, the first outer layer contains a polymeric blend of a higher density, higher melting point, broad molecular weight distribution, higher vicar softening point VLDPE with a lower density, lower melting point, narrow molecular weight distribution, lower vicar softening point, ethylene alpha-olefin copolymer.

The core layer of the films of Examples 4 and 5 comprised a blend of 94 wt. % of an ethylene-butene-1 copolymer available under the trademark Exact 3027 with 4% of the aforementioned Atmer 8112 additive and 2% of a slip agent containing-additive (antiblock polyethylene master batch) which is sold under the trademark Ampacer 50914 by Ampacer Corporation of Tarrytown, N.Y., U.S.A. Ampacer 50914 contains 5% ethylene-bis-oleamide in an LDPE base and functions as a slip and antiblock agent.

The second outer layer of the films of Examples 4 and 5 comprise a blend of 80% of Exact 3027, 15% of Exact 4011, and 2% of Ampacer A/B 50914 and 3% of a second additive which is available from Ampacet Corporation under the trademark Ampacer 100031. Ampacer 100031 contains about 1.15% of an oleamide and 3% of a fluoroelastomer in an LDPE base, and functions as a slip agent and processing aid.

In making the multilayer films of Examples 4 and 5, one extruder was used for each layer and the heat plastified resins from each extruder were introduced to a coextrusion die from which the resins were coextruded into a blown film. For each of the above three layers, the layer blend constituents preblended in a drum mixer, placed in a hopper, then fed from the hopper into an attached standard single screw extruder where the resin and/or mixture was heat plastified and extruded through a three layer coextrusion die and inflated into a blown film. The extruder barrel temperature profile for each of the three layers was about 310° F. to 390° F. (154°–199° C.). The extrusion die had an annular exit opening of 8 inch (20 cm) diameter with 45 mil (1.14 mm) gap. The coextrusion die temperature was set at about 400° F. (204° C.). The extruded multilayer melt was pulled from the die with a pair of opposing nip rolls so that the tube passed over a single trapped bubble of air located between the die and nip rolls thereby causing radial expansion of the tube; simultaneously, the inflated tube was externally and internally cooled. The blow up ratio was about 2:1. The external and internal cooling was with refrigerated air (about 45°–55° F.) and an internal bubble cooling unit was used. The apparatus and process used was similar to that described above with respect to the drawings.

The cooled blown film was flattened by passage through a pair of nip rollers whose speed was controlled relative to the extrusion rate. In Examples 4 and 5, a flattened tube of about 28 inches (71 cm) flat width and 0.6 mil (15 microns)

thickness was produced. Such variables as the blow up ratio, nip roll speeds, extrusion screw speeds, extrusion rates, bubble cooling, are generally adjusted to maximize bubble stability and throughput for the desired amount of film expansion and size. The resultant films of Examples 4 and 5 were easily made and had an excellent appearance. The tubular film was slit into two sheets and wound on reels. The physical properties of the films were measured and are reported in Tables 1 and 2 along with measured values for comparative films 1–3 (not of the invention).

Puncture resistance was also tested and the film of example 4 had dramatically higher puncture resistance relative to all three comparative examples. Advantageously, puncture resistant films according to the present invention may better prevent puncture during the packaging process or during handling by customers, and prevent puncture by sharp bones which may be found e.g. on fresh red meat cuts such as T-bone steaks, crown rib roasts, pork or beef ribs or other bone-in meat products.

TABLE 1

| EX. NO. | FIRST LAYER WT. % | CORE LAYER WT. % | SECOND LAYER WT. % | AVG. GAUGE mil (μ) | TENSILE STRENGTH AT RT × $10^3$ psi psi (MPa) MD/TD | ELONG. AT BREAK AT RT % MD/TD | SECANT MODULUS AT 1% × $10^3$ psi (MPa) MD/TD | TEAR STRENGTH g/mil (g/μ) MD/TD | $O_2$GTR* AT RT × $10^3$ | WVTR** |
|---|---|---|---|---|---|---|---|---|---|---|
| 1 | PVC plasticizer | — | — | .60 (15) | 5.5/5.5 (38/38) | 275/304 | 7.3/9.1 (50/63) | 75/85 (3.0/3.3) | 16.3 (18) | 456 (15) |
| 2 | EVA | EVA Poly-butylene | EVA | .64 (16) | 2.7/2.9 (19/20) | 338/150 | N.D. | 106/139 (4.17/5.47) | 27.1 (15) | N.D. |
| 3 | EVA | $C_2$ α-olefin | EVA | .69 (18) | 4.9/2.4 (34/17) | 277/752 | 19.1/17.6 (132/121) | 104/514 (4.09/20.2) | 25.3 (18) | 67 (15) |
| 4† | 66% e 30% c 4% p | 94% a 4% p 2% q | 80% a 15% c 2% q 3% r | .63 (16) | 5.5/5.4 (38/37) | 1133/1579 | 17.3/20.0 (119/138) | 184/285 (7.24/11.2) | 23.3 (13) | N.D. |
| 5†† | 66% e 30% c 4% p | 94% a 4% p 2% q | 80% a 15% c 2% q 3% r | .63 (16) | 6.5/5.0 (45/34) | 1289/1456 | 22.4/23.9 (154/165) | 163/393 (6.41/15.5) | N.D. | N.D. |

ND = NOT DETERMINED
†Layer ratio was 2:1:1 (The first outer layer had 50% and the core and second layers each had 25% of the total film thickness.)
††The layer compositions were the same as Example 4, but layer ratio was 14:3:3 (The first outer layer had 70% and the core and second layers each had 15% of the total film thickness.)
RT = Room Temperature
*Oxygen Gas Transmission Rate ($O_2$GTR) is in units of $cm^3$ per $meter^2$ per 24 hours at 1 atmosphere for the thickness of film tested which is listed below the rate in microns ( ).
**Water Vapor Transmission Rate (WVTR) is in units of grams per $meter^2$ per 24 hours at 100° F. (37.8° C.) under ambient pressure (~1 atmosphere) for the thickness of film tested which is listed below the rate in microns ( ).

TABLE 2

| EX. NO. | HAZE % | GLOSS AT 45° ANGLE H.U. | SHRINK AT 90°C. % MD/TD | PERMANENT DEFORMATION % MD/TD | THUMB DEPRESSION UNITS | HOT BAR SEAL RANGE °F. (°C.) | DYNAMIC PUNCTURE cmKg/mil (cmKg/μ) |
|---|---|---|---|---|---|---|---|
| 1 | 2.3 | 79 | 15/0 | 3.3/4.5 | 5 | 280–360 (138–182) | 1.8 (0.071) |
| 2 | 1.8 | 73 | ND | 4.7/4.9 | 3 | 210–260 (99–127) | 0.9 (0.04) |
| 3 | 4.2 | 75 | ND | 7.3/3.7 | 3 | 230–260 (110–127) | 0.9 (0.04) |
| 4 | 1.2 | 86 | 7/1 | 3.1/3.5 | 4.5 | 200–260 (93–127) | 10.3 (0.41) |
| 5 | 1.3 | 88 | ND | 3.7/4.8 | 5 | 200–250 (93–121) | ND |

ND = NOT DETERMINED

The properties measured and reported in Tables 1 and 2 demonstrate that the inventive films of examples 4 and 5 (which had a similar thickness to the commercial PVC control film of example 1) have similar tensile strength, permanent deformation, oxygen permeability and thumb depression values to the commercial PVC film of example 1. Also, examples 4 and 5 of the invention have better optical properties i.e. haze and gloss than the comparative examples 1–3. These improved optical properties provide a package with an improved appearance for retail sale and greater clarity to see the packaged product.

Examples 4 and 5 also demonstrate superior tensile strength to the comparative multilayer polyolefin films of examples 2 and 3. The strength of these films of the invention also makes them more resistant to breakage during handling, and puncture by bones. The low machine direction (MD) and transverse direction (TD) shrinkage values for example 4 is believed typical of many embodiments of the present invention where the inventive film is produced by the single bubble, blown film process. These low shrinkage values and the high tear strength values are indicative of blown films as opposed to films which are manufactured by a more complicated double bubble or tenter frame orientation process. Advantageously, the hot bar sealing range for example 4 is better than the range for either of the comparative polyolefin films of examples 2 and 3. Example 4 has a 60° F. (33° C.) sealing window and allows seal initiation at lower temperatures.

In contrast, the sealing window for comparative examples 2 and 3 is narrower being 50° F. (28° C.) and 30° F. (17° C.), respectively. Example 5 has a sealing range which is as broad as that for comparative example 2 but with a seal initiation beginning at a lower temperature. Example 5 has a hot bar heat sealing range which was measured to be 20° F. (11° C.) broader than the range for the film of example 3 which is believed to contain an ethylene alpha olefin copolymer in its core layer. The broad sealing range for the inventive films was achieved without subjecting the film to special crosslinking procedures such as irradiation by an electron beam.

The inventive films exhibited much better elastic recovery as seen by the superior thumb depression values which for examples 4 and 5 were close to or the same as values obtained for the PVC control film of example 1. Comparative polyolefin multilayer films of examples 2 and 3 had inferior thumb depression values indicative of slower elastic recovery from finger or thumb pokes relative to the inventive films. The comparative examples 2 and 3 also exhibited poorer deformation recovery than examples 4 and 5 as seen by the higher percent permanent deformation values of examples 2 and 3. Also the inventive films of examples 4 and 5 are much stretchier having much higher elongation at break values. These inventive films contain no poly(vinyl chloride) i.e., they are poly(vinyl chloride) free. They also have a permanent deformation of less than 5.0 percent in both the machine and transverse directions. They also have a permanent deformation of less than 4.0 percent in at least one direction.

EXAMPLES 6–10

Examples 6–10 are all three layer multilayer polyolefin blown films made using the apparatus and process described above with respect to examples 4 and 5 except as noted otherwise below. The compositions of each layer are blends having the components and amounts indicated in Table 3 below. Examples 6–10 are all examples of the present invention. Examples 6 and 8 both had layer thickness ratios of 50:25:25 while examples 7, 9 and 10 all had layer thickness ratios of 70:15:15. All of the examples had identical compositions for the core and second outer layers. The first outer layers of examples 6 and 7 were the same in composition and utilized a single, narrow molecular weight, ethylene alpha-olefin copolymer blended with less that 10% of an antifog agent containing additive. The first outer layer of examples 8, 9 and 10 were all blends of a narrow molecular weight distribution ($\overline{M}_w/\overline{M}_n<3$) ethylene alpha olefin copolymer with a broad molecular weight distribution ($\overline{M}_w/\overline{M}_n \geq 3$) ethylene alpha olefin copolymer. Examples 8 and 9 had identical compositions to each other but different layer thickness ratios. Example 10 varied the particular narrow $\overline{M}_w/\overline{M}_n$ copolymer used in the first outer layer and also the relative amounts of the constituents.

The films of examples 6–10 were all produced under similar process conditions using a 2:1 blow up ratio, a similar extruder temperate profile (310°–390° F.), die temperature (about 390° F.), and cooling conditions. Physical properties of the films produced were measured and are reported in Tables 3 and 4. The first outer layer was the inner layer of the blown film tube.

TABLE 3

| EX. NO. | FIRST LAYER (wt. %) | CORE LAYER (wt. %) | SECOND LAYER (wt. %) | AVG. GAUGE mil (μ) | TENSILE STRENGTH AT RT × $10^3$ psi (MPa) MD/TD | ELONG. at BREAK at RT % MD/TD | SECANT MODULUS at 1% × $10^3$ psi (MPa) MD/TD | TEAR STRENGTH g/mil (g/μ) MD/TD | $O_2$GTR* at RT × $10^3$ | WVTR** |
|---|---|---|---|---|---|---|---|---|---|---|
| 6† | 96% f 4% p | 94% a 4% p 2% q | 80% a 15% c 2% q 3% r | .62 (16) | 4.3/4.9 (30/34) | 1103/1529 | 20.8/22.9 (143/158) | 140/349 (5.5/14) | N.D. | N.D. |
| 7†† | 96% f 4% p | 94% a 4% p 2% q | 80% a 15% c 2% q 3% r | .61 (15) | 5.2/5.3 (36/37) | 1267/1711 | 20.7/23.9 (143/165) | 186/353 (7.3/14) | N.D. | N.D. |
| 8† | 66% f 30% e 4% p | 94% a 4% p 2% q | 80% a 15% c 2% q 3% r | .53 (13) | 4.9/4.9 (34/34) | 1060/1597 | 21.7/23.9 (150/165) | 200/322 (7.9/13) | N.D. | N.D. |
| 9†† | 66% f 30% e 4% p | 94% a 4% p 2% q | 80% a 15% c 2% q 3% r | .56 (14) | 6.2/3.5 (43/24) | 1288/1234 | 22.9/24.5 (158/169) | 216/454 (8.5/18) | N.D. | N.D. |
| 10†† | 50% i 46% e 4% p | 94% a 4% p 2% q | 80% a 15% c 2% q 3% r | .52 (13) | 6.2/5.2 (43/36) | 1247/1579 | 18.5/20.4 (128/141) | 162/366 (6.4/14) | 27.1 (13) | 71 (13) |

RT = Room Temperature
ND = NOT DETERMINED
†Layer thickness ratio was 2:1:1.
††Layer thickness ratio was 14:3:3.
*Oxygen Gas Transmission Rate ($O_2$GTR) is in units of cm$^3$ per meter$^2$ per 24 hours at 1 atmosphere for the thickness of film tested which is listed below the rate in microns ( ).
**Water Vapor Transmission Rate (WVTR) is in units of grams per meter$^2$ per 24 hours at 100° F. (37.8° C.) under ambient pressure (~1 atmosphere) for the thickness of film tested which is listed below the rate in microns ( ).

TABLE 4

| EX. NO. | HAZE % | GLOSS AT 45° ANGLE H.U. | SHRINK AT 90° C. % MD/TD | PERMANENT DEFORMATION % MD/TD | THUMB DEPRESSION UNITS | HOT BAR SEAL RANGE °F. (°C.) |
|---|---|---|---|---|---|---|
| 6 | 1.5 | 87 | ND | 2.9/2.1 | 5.0 | 220–230 (104–110) |
| 7 | 1.4 | 88 | ND | 3.1/3.0 | 5.0 | 220–230 (104–110) |
| 8 | 1.8 | 85 | ND | 3.6/3.0 | 5.0 | 220–240 (104–116) |
| 9 | 1.4 | 86 | ND | 4.1/3.1 | 4.8 | 230–240 (110–116) |
| 10 | 1.5 | 86 | 6/1 | 3.0/3.0 | 5.0 | 210–250 (99–121) |

ND = NOT DETERMINED

The properties measured and reported in Tables 3 and 4 demonstrate production of films which are strong with good tear strength, high oxygen permeability which is sufficient to allow red meat bloom, and low water permeability to prevent moisture loss from water containing products wrapped in the present film. All of the inventive films have excellent optical properties with low haze and high gloss, and have excellent elastic properties exhibiting low permanent deformation values and excellent recovery from finger pokes as shown by thumb depression values similar to those obtained for plasticized PVC film.

Heat shrinkability was measured for example 10 and it is seen that the beneficial properties reported are found in a low shrink, stretch film which does not require heat shrinking apparatus for either use or for optimum properties. The films of examples 6–9 (as well as all the other examples of the invention presented herein) are all expected to have similar shrinkage values to those obtained for example 10. In particular, the transverse direction (TD) shrinkage value is low, well below 10%, preferably below 5% and in the case of example 10 being about 1% and thereby being an indication that the instant film was made using a process where the extruded polymer is enlarged into a film from the polymer melt.

It is seen that the examples which utilize a first outer layer blend of broad and narrow molecular weight distribution polymers have higher burn through temperatures and the films of examples 8 and 10 especially have a broader sealing range than the film of examples containing only the narrow molecular weight distribution $C_2$ α-olefin copolymer. Examples 6–10 all utilize very low density polyethylene copolymer (VLDPE) in each of the three layers, with a blend of a 0.900 g/cm$^3$ density $C_2C_4$ VLDPE copolymer having a high melting point of about 92° C. with a 0.888 g/cm$^3$ density $C_2C_4$ copolymer having a low melting point of about 66° C.

EXAMPLES 11–17

Example 11 is a commercially available heat shrinkable multilayer polyolefin food wrap film sold by Asahi Chemical Industry Co., Ltd. of Tokyo, Japan under the trademark Suntec-C. It is believed to be a three layer film having EVA outer layers on both sides of a polypropylene core layer. The physical properties of this film were tested and are reported in Tables 5 and 6. Examples 12–14 are comparative examples (not of the invention). Examples 15–17 are examples of the invention.

Example 12 is a three layer coextruded film having EVA containing core and second outer layers and a first outer layer comprising a blend of (a) 43 wt. % of an ethylene octene-1 copolymer (Attane XU 61520.01) having at least 80 wt. % of its polymer units derived from ethylene, and having a melting point of at least 90° C. and a density of at least about 0.900 and less than 0.915 g/cm$^3$; (b) 40 wt. % of an ethylene butene-1 copolymer (Exact 4011) having at least 75 wt. % of its polymer units derived from ethylene, and having a melting point less than about 80° C. and a density less than 0.900 g/cm$^3$; (c) 15 wt. % of a copolymer of propylene and ethylene (now available as Shell DS6-D81) having at least 80 wt. % of its polymer units derived from propylene; and (d) 2 wt. %. of an antifog containing additive (Atmer 8112).

Example 13 is a three layer polyolefin film having a polybutylene (<1% $C_2$) copolymer core layer, an ethylene acrylic acid copolymer first outer layer, and a second outer layer comprising a blend of (a) 84 wt. % of an ethylene octene-1 copolymer (Attane XU 61520.01) having at least 80 wt. % $C_2$ polymer units, a melting point of at least 90° C. and a density of at least 0.900 g/cm$^3$ and less than 0.915 g/cm$^3$, (b) 10 wt. % of an ethylene butene-1 copolymer (Exact 4011) having at least 75 wt. % of its polymer units derived from ethylene, a melting point less than about 80° C. and a density less than 0.900 g/cm$^3$ and 6 wt. % of additives containing slip agents.

Example 14 is a three layer film having an EAA first outer layer similar to example 13 above. The second outer layer comprises a blend of (a) 80 wt. % Exact 3027 $C_2C_4$ VLDPE copolymer having a density of at least about 0.900 g/cm$^3$ and below 0.915 g/cm$^3$, and having at least 75 wt. % of its polymer units derived from ethylene and having a melting point of at least about 90° C., (b) 15 wt. % of Exact 4011 (as described in example 12), and (c) about 5% of slip-agent containing additives. The core layer comprises a blend of (a) about 90 wt. % of the Exact 3027 polymer with (b) 6 wt. % Exact 4011 polymer and (c) 4 wt. % of slip and antifog containing additives.

Examples 15–17 are all examples of the invention having identical core and second outer layer compositions; the first outer layer compositions vary. All three first outer layers are each a blend of three copolymers with an antifog agent containing additive. In each instance the majority of the first outer layer comprises a VLDPE having a density of at least 0.900 g/cm$^3$ and below 0.915 g/cm$^3$ and having a melting point of at least 90° C. Blended with this VLDPE is a low melting point (less than about 80° C.) substantially linear ethylene alpha olefin copolymer having a density less than 0.900 g/cm³. The third component of the blend varies. In Example 15, the third component is a polybutylene copolymer having less than about 1% ethylene. In example 16 the third component comprises an ethylene propylene rubber having a propylene content of about 32%. In example 17 the third component comprises a propylene ethylene copolymer having at least 80 wt. % of its polymer units derived from propylene.

The particular materials, amounts and additives described above for examples 12–17 were used to make blown films using the blown film process substantially as described above for Examples 4 and 5 (except as noted). The extruder and die temperatures for all examples 12–17 were set at about 350° F. (177° C.) and the films all had a layer thickness ratio of about 70:15:15. Cooling air temperatures ranged from about 44°–75° F. (7°–24° C.) and the blow up ratio was about 2:1. Physical properties for the resultant blown films were measured and are reported in Tables 5 and 6 below.

TABLE 5

| EX. NO. | FIRST LAYER (wt. %) | CORE LAYER (wt. %) | SECOND LAYER (wt. %) | AVG. GAUGE mil (μ) | TENSILE STRENGTH AT RT × $10^3$ psi (MPa) MD/TD | ELONG. at BREAK at RT % MD/TD | SECANT MODULUS at 1% × $10^3$ psi (MPa) MD/TD | TEAR STRENGTH g/mil (g/μ) MD/TD |
|---|---|---|---|---|---|---|---|---|
| 11 | EVA | Polypropylene | EVA | .51 (13) | 10.0/6.8 (69/47) | 187/324 | 30.0/28.0 (207/193) | 46/26 (1.8/1.0) |
| 12 | 43% e<br>40% c<br>15% j<br>2% p | 93% s<br>3% c<br>2% p<br>2% q | 94% s<br>3% q<br>3% t | .61 (15) | 3.8/2.7 (26/19) | 364/578 | N.D. | 67/140 (2.6/5.5) |
| 13 | 98% u<br>2% p | 95% m<br>2% p<br>3% q | 84% e<br>10% c<br>3% q<br>3% t | .67 (17) | 6.3/4.0 (43/28) | 165/686 | N.D | 263/83 (10/3.3) |
| 14 | 98% u<br>2% p | 90% a<br>6% c<br>2% p<br>2% q | 80% a<br>15% c<br>2% q<br>3% t | .69 (18) | 5.4/4.1 (37/28) | 100/722 | N.D. | 239/31 (9.4/1.2) |
| 15 | 73% e<br>17% c<br>8% m<br>2% p | 95% a<br>2% p<br>3% q | 79% a<br>15% c<br>3% q<br>3% t | .69 (18) | 5.5/5.0 (38/34) | 443/1281 | N.D | 206/373 (8.1/15) |
| 16 | 73% e<br>15% c<br>10% k<br>2% p | 95% a<br>2% p<br>3% q | 79% a<br>15% c<br>3% q<br>3% t | .81 (21) | 2.5/2.2 (17/15) | 515/766 | N.D. | 173/361 (6.8/14) |
| 17 | 68% e<br>15% j<br>15% c<br>2% p | 96% a<br>2% p<br>2% q | 80% a<br>15% c<br>2% q<br>3% t | .61 (15) | 6.6/4.0 (46/28) | 767/1037 | N.D | 164/325 (6.5/13) |

TABLE 6

| EX. NO. | HAZE % | GLOSS AT 45° ANGLE H.U. | SHRINK AT 90° C. % MD/TD | PERMANENT DEFORMATION % MD/TD | THUMB DEPRESSION UNITS | HOT BAR SEAL RANGE °F. (°C.) | $O_2$GTR* × $10^3$ | DYNAMIC PUNCTURE cmKg/mil (cmKg/μ) |
|---|---|---|---|---|---|---|---|---|
| 11 | 1.0 | 93 | 55/32 | 5.4/5.3 | 5.0 | 230–320 (110–160) | 20.6 (13) | 2.0 (0.079) |
| 12 | 5.3 | 68 | N.D. | 7.4/6.5 | N.D. | 210–310 (99–154) | N.D. | N.D. |
| 13 | 11.5 | 51 | N.D. | 11.9/3.7 | N.D. | 220–260 (104–127) | N.D. | N.D. |
| 14 | 9.5 | 55 | N.D. | 7.9/3.0 | 5.0 | 220–250 (104–121) | N.D. | N.D. |
| 15 | 3.4 | 68 | N.D. | 6.4/7.0 | 3.5 | 220–250 (104–121) | N.D. | N.D. |
| 16 | 3.8 | 68 | N.D. | 5.5/8.6 | 3.0 | 250–260 (121–127) | N.D. | N.D. |
| 17 | 2.3 | 88 | N.D. | 7.1/9.0 | 3.5 | 220–320 (104–160) | 15.7 (20) | 1.2 (0.047) |

ND = NOT DETERMINED
*Oxygen Gas Transmission Rate ($O_2$GTR) is in units of cm³ per meter² per 24 hours at 1 atmosphere for the thickness of film tested which is listed below the rate in microns ( ).

The properties measured and reported in Tables 5 and 6 show the commercially available polypropylene and EVA shrink film of example 11 has excellent elastic, strength and optical properties. Advantageously, films of the present invention (examples 15–17) need not be made by the expensive and relatively complicated biaxial stretching process required to produce the 90° C. heat shrinkable film of example 11; yet the inventive films have good strength, elastic deformation and optical properties. Also, beneficially the inventive films have greater resistance to tearing as shown by the higher tear strength values, and also have greater stretchability as demonstrated by the high elongation at break properties. Other advantages of the inventive films with respect to machinability and use on automatic packaging machines and relative to the heat shrinkable Suntec-C film are apparent from further testing described below.

Example 17 is a particularly beneficial embodiment of the present invention. The inventive film of example 17 exhibits a good combination of cutability (i.e., ease of being cut or severed by knives), particularly in the transverse direction, puncture resistance, elastic properties such as thumb depression recovery, a similar oxygen permeability to plasticized PVC (which is sufficient to allow red color blooming in packaged fresh red meat), excellent optical properties (low haze and high gloss), and a wide hot bar seal range of about 100° F. (55.5° C.), in a blown stretch film.

Examples 15 and 16 are formula variations having a generally similar combination of properties to Example 17 but a narrower sealing temperature range, and less favorable optical properties. Machinability on automatic packaging equipment is also less favorable than the preferred film of example 17.

Comparative example 12 had a first outer layer formulation similar to those found useful in the inventive film, but with a core layer and second outer layer comprising an ethylene vinylacetate copolymer. This comparative film also had a wide seal range, low permanent deformation, high tear strength, and was free from stretch marks, but the optical properties were less favorable than those of preferred example 17 and, as seen below, the machinability i.e., functionality on packaging equipment was markedly inferior.

Comparative examples 13 and 14, both utilized EAA based first outer layers. In the case of example 14, the core and second outer layers were similar to formulations used successfully in the multilayer films of the present invention.

In the case of example 13, the second outer layer was a similar formulation to those found useful in the inventive films but the core layer was a polybutylene based copolymer. Both of comparative examples 13 and 14 had inferior optical properties (high haze and low gloss) relative to the inventive films of examples 15–17. The film of example 13 also had a poor MD permanent deformation value.

The comparative films 11–14 and inventive films 15–17 were all subjected to a machine packaging test using a stretch wrap packaging machine manufactured by the Waldyssa Company of Lugano, Switzerland under the trademark Waldyssa W40. This machine is fitted with a serrated knife which makes a complete cut across the film (transverse direction). Four medium sized apples were packaged on an expanded polystyrene tray using each of the test films. Each film was stretched approximately 10% over the apple and tray packages. Unless otherwise noted, 25 packages (each having four apples on a tray) were made using each film. The packaging operation was observed and the films were evaluated for performance including the presence or absence of holes (splits) in the packaged film, ability to cut the film with the machine's knife (cut), splitting by or at the side clamps, ease of stretching to provide a sufficient amount of film around the package (stretch), ability of the film to fold properly (fold), heat sealability (seal), cling, strength, and appearance. Defects such as splitting of the film are the most serious and detrimental because the packaged product is exposed to the environment which may have a bad effect on the packaged good. Other problems associated with openings in the packaged film surface include cross-contamination of ready to eat foods with raw foods, particularly meat and poultry, which are intended to be cooked before consumption, and consumer perception of an inferior product that has been dropped, tampered with, or otherwise damaged.

The machine was set up for testing and two sets of 25 packages of four apples per tray were packaged using a commercially produced plasticized PVC film as a control. The first set of 25 stretch wrapped trays produced twenty acceptable packages and five containing medium to large size holes. The second set of twenty-five packages produced twenty-one acceptable packages and four packages containing small to large holes. The results of packaging with the test films of examples 11–13 and 15–17 are reported in Table 7. The film of example 14 was not tested on the packaging machine due to a problem in rewinding the film which resulted in a crushed core.

TABLE 7

| Ex. No. | Cling | Fold | Seal | Cut | Strength | Stretch | Appearance | Acceptable Machinability | | |
|---|---|---|---|---|---|---|---|---|---|---|
| | | | | | | | | No. of Units | | % |
| | | | | | | | | Yes | No | Acceptance |
| 11 | Good | Good | Good | Poor | Very Good | Very Difficult | Very Good | * | * | * |
| 12 | N.D. | Poor | Poor | Poor | Very Poor | Poor | N.D. | 0 | 25 | 0 |
| 13 | Minimal | Very Good | Very Good | Poor | Very Poor | Good | Poor | 1 | 24 | 4 |
| 15 | Good | Poor | Fair | Fair | Good | Too Easy | Fair | 16 | 8 (split) 1 (fold) | 64 |
| 16 | Good | Poor | Fair | Fair | Poor | Too Easy | Fair | 6 | 19 (split) | 24 |
| 17 | Good | Good | Good | Fair | Good | Difficult | Good | 45 | 4 (fold) | 92 |

N.D. - Not Determined
*The machine failed to pick up the leading edge of the film on 50%.

As noted above with respect to the machinability packaging test a plasticized PVC film having a nominal thickness of 60 gauge (15.4 microns) was tested by wrapping two sets of 25 packages. Each package contained four medium sized apples on a rectangular tray made of expanded polystyrene. Use of this PVC film which is commercially available under the trademark Fresh Wrap PS-E by Filmco International Ltd. Sedgefield England on the Waldyssa W40 packaging machine resulted in 41 acceptable packages and 9 packages having small to large holes thereby yielding an 82% acceptable packaging rate (18% failures). The normal rate of this PVC film on this equipment is 6% or less, therefore the test set up for judging machinability presented a harsh test. As indicated above, about 10% stretch was required to package four medium sized apples on the tray. However, stretch requirements may range e.g., from 10 to 20%. The 10% value is only a guide because in practice levels of stretch will vary around the package and may be locally higher than average. All of the polyolefin films tested, except the comparative film 11, exhibited stretch marks where the yield point was exceeded on two sides of the package.

Example 17 of the present invention yielded the best results of the polyolefin film tested relative to PVC film. This film produced the highest percentage of acceptable packages (92%). The inventive film exhibited good cling, folding, sealing, strength and appearance properties in packages use. Ability to cut the film with the machine's knife was fair. While stretching the film was difficult relative to PVC film, a first set of 25 packages were made and all were acceptable. In view of the excellent machinability, a second set of 24 packages were made and 20 of the 24 packages were acceptable with only four packages suffering from fold defects. There was no splitting of the film and no holes in any of the 49 test packages run. In the context of this test "poor folds" refer to bunching of the film under the package which may often result in other failures.

The commercial heat shrinkable polyolefin multilayer film of example 11 (Suntec-C) was very difficult to grip for cutting. The film was observed to slip badly in the machine grippers. The machine failed to pick up the leading edge of the film on 50% of the packages resulting in a 50% failure to package. There were other failures due to lack of stretch and other problems. It is believed, without wishing to be bound by the belief, that this pickup failure may be related to high stiffness and toughness of the film which in turn is related to its being a highly oriented film which is indicated by its being heat shrinkable at low temperatures e.g., this film has at least 30% shrinkage in both MD and TD directions at 90° C. No stretch marks were observed with this film.

The film of comparative example 12 utilized a first outer layer similar to that of the inventive films but core and second outer layers of EVA. This film performed very poorly; there was 100% failure to package with poor cutting by knife, poor folding, burn-through on the seals, and film splitting by the side clamps. The film was evaluated as being very weak and totally unacceptable for machine packaging.

The film of comparative example 13 was very difficult to cut, similar to comparative example 11. It also had poor gloss and transparency, and an undesirably low level of cling. This film was weak and did not machine well; only one of the 25 test packages was acceptably produced. Very good folding and sealing, and good stretch was evident, but there was splitting by the side clamps which resulted in an unacceptable failure rate of 96%.

Examples 15 and 16 of the invention had machinability rates under these harsh conditions of 64% and 24% acceptable packages respectively. For example 15, eight of the nine defective packages had bad folding; only one exhibited split film. In example 16 all 19 of the defective packages were due to split film. Other properties noted in the table ranged from fair to good except both had poor folding behavior and the strength of example 16 films were evaluated as poor. The poor folding is believed to be attributable to the easy stretching of the film.

The above test demonstrated the superiority of the inventive film of example 17 to all the comparative examples. The films of examples 15 and 16 although not as good as example 17 were better than the comparative examples and demonstrated that acceptable packages could be made in the harsh test of machine packaging.

Advantageously, it is seen that embodiments of the present invention may have excellent optical properties including gloss values at 45° of at least 70 Hunter Units (HU), preferably at least or greater than 80 HU, and low haze values of less than 5.0 percent, preferably less than 3.0 percent. Also, a hot bar heat sealing range of at least 16° C., preferably at least 30° C., more preferably at least 50° C. may be obtained with a burn-through temperature of at least 125° C.

EXAMPLES 18–19

Additional inventive films were made by a process similar to that disclosed above for examples 4 and 5, except as noted. The die temperature was set at about 370° F. (188° C.) and blown film having a flattened tube width of about 24 inches was produced. Properties of the film were measured and are reported in Tables 8 and 9 along with the layer composition.

TABLE 8

| EX. NO. | FIRST LAYER WT. % | CORE LAYER WT. % | SECOND LAYER WT. % | AVG. GAUGE mil (μ) | TENSILE STRENGTH AT RT x $10^3$ psi psi (MPa) MD/TD | ELONG. AT BREAK AT RT % MD/TD | SECANT MODULUS at 1% x $10^3$ psi (MPa) MD/TD | TEAR STRENGTH g/mil (g/μ) MD/TD |
|---|---|---|---|---|---|---|---|---|
| 18† | 98% c 2% p | 96% a 2% p 2% q | 96% a 2% q 2% t | .67 (17) | 4.6/4.8 (32/33) | 1173/1366 | 14.0/15.7 (97/108) | 214/211 (8.4/8.3) |
| 19†† | 98% c 2% p | 96% a 2% p 2% q | 96% a 2% q 2% t | .58 (15) | 5.3/4.8 (37/33) | 1183/1404 | 13.7/15.5 (94/107) | 151/236 (5.9/9.3) |

ND = NOT DETERMINED

TABLE 8-continued

| EX. NO. | FIRST LAYER WT. % | CORE LAYER WT. % | SECOND LAYER WT. % | AVG. GAUGE mil (μ) | TENSILE STRENGTH AT RT × $10^3$ psi psi (MPa) MD/TD | ELONG. AT BREAK AT RT % MD/TD | SECANT MODULUS at 1% × $10^3$ psi (MPa) MD/TD | TEAR STRENGTH g/mil (g/μ) MD/TD |
|---|---|---|---|---|---|---|---|---|

†Layer ratio was 2:1:1 (The first outer layer had 50% and the core and second layers each had 25% of the total film thickness.)
††The layer compositions were the same as Example 18, but layer ratio was 6:7:7 (The first outer layer had 30% and the core and second layers each had 35% of the total film thickness.)
RT = Room Temperature

TABLE 9

| EX. NO. | HAZE % | GLOSS AT 45° ANGLE H.U. | PERMANENT DEFORMATION % MD/TD | THUMB DEPRESSION UNITS | HOT BAR SEAL RANGE °F. (°C.) |
|---|---|---|---|---|---|
| 18 | 1.0 | 77 | 2.3/4.8 | 4.8 | 180–210 (82–99) |
| 19 | 0.9 | 77 | 2.6/5.4 | 5.0 | 180–210 (82–99) |

ND = NOT DETERMINED

The films of example 18 and 19 are believed to have a high monomer extractable content because of use of more than 40 wt. % of an ethylene butene-1 copolymer having a density less than 0.900 g/cm³ and a melting point less than 70° C. Therefore these films of examples 18 and 19 while suitable for packaging nonfood items are believed to be not appropriate for use in food content applications according to U.S. government regulations. However, the above test results demonstrate that these films have excellent thumb depression values, low permanent deformation, low haze and good gloss. Such films are believed to have utility as an overwrap for articles in which the film is not in contact with food.

EXAMPLES 20–22

Additional inventive three layer films were made by a process similar to that disclosed above for examples 4 and 5, except as noted. The extruder and die temperatures for examples 20–21 were in the range of 300°–350° F. (149°–177° C.). Example 22 utilized the extruder temperatures of about of about 395° F. (202° C.). Internal and external cooling air temperatures ranged from about 50°–66° F. (10°–19° C.) for examples 20–22 was about 25 inches (63.5 cm). The layer composition and thickness ratios are reported in Table 9. Physical properties for the resultant blown films were measured and are reported in Tables 10 and 11 below.

TABLE 10

| EX. NO. | FIRST OUTER LAYER WT. % | CORE LAYER WT. % | SECOND OUTER LAYER WT. % | AVG. GAUGE mil (μ) | TENSILE STRENGTH AT RT × $10^3$ psi psi (MPa) MD/TD | ELONG. AT BREAK AT RT % MD/TD | SECANT MODULUS AT 1% × $10^3$ psi (MPa) MD/TD | TEAR STRENGTH g/mil (g/μ) MD/TD |
|---|---|---|---|---|---|---|---|---|
| 20† | 96% a 2% p 2% q | 68% e 15% c 15% j 2% p | 80% a 15% c 2% q 3% t | .64 | 4.6/4.6 | 956/1625 | 18.5/17.6 | 233/301 |
| 21†† | 96% a 2% p 2% q | 68% e 15% c 15% j 2% p | 80% a 15% c 2% q 3% t | .65 | 5.7/3.2 | 1329/988 | 16.4/20.4 | 95/237 |
| 22††† | 68% e 15% c 15% j 2% p | 96% a 2% p 2% q | 80% a 15% c 2% q 3% t | .70 | 4.2/4.8 | 923/1279 | 17.4/18.7 | 205/312 |

†Layer ratio was 3:14:3 (The core layer had 70% and the first and second outer layers each had 15% of the total film thickness.)
††The layer compositions were the same as Example 20, but the layer ratio was 1:2:1 (The core layer had 50% and the first and second outer layers each had 25% of the total film thickness.)
†††Layer ratio was 14:3:3 (The first outer layer had 70% and the core and second layers each had 15% of the total film thickness.)
RT = Room Temperature

TABLE 11

| EX. NO. | HAZE % | GLOSS AT 45° ANGLE H.U. | PERMANENT DEFORMATION % MD/TD | THUMB DEPRESSION UNITS | HOT BAR SEAL RANGE °F. (°C.) |
|---|---|---|---|---|---|
| 20 | 1.7 | 88 | 6.1/5.4 | 4.8 | 200–290 |
| 21 | 1.7 | 88 | 6.4/5.3 | 4.8 | 210–250 |
| 22 | 2.3 | 77 | 6.2/10.7 | 4.7 | 220–310 |

Examples 20–22 all demonstrate good physical properties. In particular, examples 20 and 22, both of which utilize the same formulation as the thickest layer of the film (being the core layer for example 20 and the first outer layer for 22), have desirably broad hot bar sealing ranges of about 90° F. (32° C.) and advantageously have a high maximum temperature before burn-through or breaking. The higher content of component (e) which has a high melting point and broad molecular weight distribution is believed to contribute to a higher value for the maximum sealing range temperature of examples 20 and 22. The higher content of component (a) which has a narrow molecular weight distribution and a lower melting point than (e) is believed to produce a lower minimum temperature for the sealing range. Also, notable are the excellent thumb depression elastic recovery values for all samples.

Further modifications of the invention will be apparent to those skilled in the art and all such modifications are deemed to be within the scope of the invention as defined in the following claims.

What is claimed is:

1. A polyolefin, multilayer flexible film having at least three layers comprising:

a first outer layer comprising at least one copolymer of ethylene and at least one $C_3$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point of at least 90° C.;

a core layer comprising at least one copolymer of ethylene and at least one $C_3$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point of at least 90° C.; and a second outer layer comprising a blend of (a) a first copolymer of ethylene and at least one $C_3$–$C_8$ alpha-olefin, said first copolymer having at least 75 weight percent of its polymer units derived from ethylene, and said copolymer having a density below 0.915 g/cm$^3$, and a melting point of at least 90° C., and (b) a second copolymer of ethylene and at least one $C_3$–$C_8$ alpha-olefin said second copolymer having at least 75 weight percent of its polymer units derived from ethylene, and having a density less than 0.900 g/cm$^3$, and a melting point less than about 80° C.; wherein said core layer is disposed between said first and second outer layers and said multilayer film has less than 10% unrestrained shrinkage at 90° C. in at least one direction.

2. A film, as defined in claim 1, wherein said first outer layer comprises a blend of said copolymer with a second copolymer of ethylene and at least one $C_3$–$C_8$ alpha-olefin, said second copolymer having at least 75 weight percent of its polymer units derived from ethylene, and having a density less than 0.900 g/cm$^3$, and a melting point less than about 80° C.

3. A film, as defined in claim 1, wherein said core layer further comprises a second copolymer of ethylene and at least one $C_3$–$C_8$ alpha-olefin, said second copolymer having at least 75 weight percent of its polymer units derived from ethylene, and having a density less than 0.900 g/cm$^3$, and a melting point less than about 80° C. in a blend with said copolymer having a melting pint of at least 90° C.

4. A film, as defined in claim 1, wherein said copolymer of said core layer has at least 80 weight percent of its polymer units derived from ethylene.

5. A film, as defined in claim 1, wherein said first copolymer of said second outer layer has at least 80 weight percent of its polymer units derived from ethylene.

6. A film, as defined in claim 1, wherein said second copolymer of said second outer layer has at least 80 weight percent of its polymer units derived from ethylene.

7. A film, as defined in claim 1, wherein said copolymer of said first outer layer has at least 80 weight percent of its polymer units derived from ethylene.

8. A film, as defined in claim 2, wherein said second copolymer of said first outer layer has at least 80 weight percent of its polymer units derived from ethylene.

9. A film, as defined in claim 2, wherein said first outer layer of said film further comprises a copolymer of propylene and ethylene having at least 80 weight percent of its polymer units derived from propylene.

10. A film, as defined in claim 3, wherein said core layer of said film further comprises a copolymer of propylene and ethylene having at least 80 weight percent of its polymer units derived from propylene.

11. A film, as defined in claim 1, wherein said first outer layer comprises an inner layer of a tube.

12. A film, as defined in claim 1, wherein said film comprises a blown film.

13. A film, as defined in claim 1, wherein said at least one copolymer of said first outer layer comprises at least about 70 weight percent of said first outer layer.

14. A film, as defined in claim 1, wherein said at least one copolymer of said core layer comprises at least 85 percent by weight of said core layer.

15. A film, as defined in claim 1, wherein said copolymer of said core layer comprises at least 90 percent by weight of said core layer.

16. A film, as defined in claim 1, wherein said film consists essentially of three layers with said first and second outer layers being directly adhered to opposing sides of said core layer.

17. A film, as defined in claim 1, wherein said copolymer of said first outer layer has a narrow average molecular weight distribution $\overline{M}_w/\overline{M}_n < 3$.

18. A film, as defined in claim 1, wherein said copolymer of said core layer has a narrow average molecular weight distribution $\overline{M}_w/\overline{M}_n < 3$.

19. A film, as defined in claim 1, wherein at least one of said first layer and said core layer comprises a blend of (i) an ethylene alpha-olefin copolymer having a narrow average molecular weight distribution $\overline{M}_w/\overline{M}_n$ of less than 3 with (ii) an ethylene alpha-olefin copolymer having an average molecular weight distribution $\overline{M}_w/\overline{M}_n$ of at least 3.

20. A film, as defined in claim 2, wherein said copolymer having a melting point of at least 90° C. of said first outer layer has an average molecular weight distribution $\overline{M}_w/\overline{M}_n$ of at least 3, and said second copolymer of said first outer layer blend has an average molecular weight distribution $\overline{M}_w/\overline{M}_n<3$.

21. A film, as defined in claim 3, wherein said copolymer having a melting point of at least 90° C. of said core layer has an average molecular weight distribution $\overline{M}_w/\overline{M}_n$ of at least 3, and said second copolymer of said core layer blend has an average molecular weight distribution $\overline{M}_w/\overline{M}_n<3$.

22. A film, as defined in claim 1, wherein said first and second copolymers of said second outer layer both have a narrow average molecular weight distribution $\overline{M}_w/\overline{M}_n<3$.

23. A film, as defined in claim 1, wherein said first and second copolymers of said second outer layer have different average molecular weight distributions with one of said copolymers having an $\overline{M}_w/\overline{M}_n. <3$ and the other copolymer having an $\overline{M}_w/\overline{M}_n 3$.

24. A film, as defined in claim 1, wherein said direction is a transverse direction.

25. A film, as defined in claim 1, wherein said multilayer film has less than 5% unrestrained shrinkage at 90° C. in a transverse direction.

26. A film, as defined in claim 1, wherein said multilayer film has an unrestrained shrinkage of less than 10% at 90° C. in both machine and transverse directions.

27. A film, as defined in claim 1, having a total multilayer film thickness of between about 8 and 30 microns.

28. A film, as defined in claim 1, having a total multilayer film thickness of between 12 and 20 microns.

29. A film, as defined in claim 1, having a total multilayer film thickness of which at least one of said first outer layer and said core layer comprises between 30 and 70%.

30. A film, as defined in claim 27, having a total multilayer film thickness of which said core layer comprises between 50 and 70%.

31. A film, as defined in claim 27, having a total multilayer film thickness of which said first outer layer comprises between 50 and 70%.

32. A film, as defined in claim 1, wherein at least one of said copolymers of ethylene and at least one $C_3$–$C_8$ alpha-olefin comprises a copolymer of ethylene and a $C_6$–$C_8$ alpha-olefin.

33. A film, as defined in claim 1, wherein at least one of said copolymers of ethylene and at least one $C_3$–$C_8$ alpha-olefin comprises a copolymer of ethylene and octene-1.

34. A film, as defined in claim 1, wherein at least one of said first outer layer and said core layer includes at least one copolymer of ethylene and octene-1 having at least 75 weight percent of its polymer units derived from ethylene and having a density below 0.915 g/cm$^3$.

35. A film, as defined in claim 1, wherein said copolymer having a melting point of at least 90° C. of at least one of said first outer layer and said core layer comprises a copolymer of ethylene and octene-1.

36. A film, as defined in claim 1, wherein said core layer is comprised of at least 40 weigh % of said copolymer.

37. A film, as defined in claim 1, wherein said copolymer of said core layer comprises at least 70 weigh % of said copolymer.

38. A film, as defined in claim 3, wherein said core layer comprises at least 60 weigh % of said copolymer having a melting point of at least 90° C., and comprises $\leq 40$ weight percent of said second copolymer.

39. A film, as defined in claim 2, wherein said first outer layer comprises at least 60 weigh % of said copolymer having a melting point of at least 90° C., and comprises $\leq 40$ weight percent of said second copolymer.

40. A film, as defined in claim 1, wherein said second outer layer comprises at least 70 weigh % of said first copolymer.

41. A film, as defined in claim 1, wherein said second outer layer comprises less than 30 weigh % of said second copolymer.

42. A film, as defined in claim 1, wherein said second outer layer comprises between about 70 to 85 weight percent of said first copolymer and about 15 to 30 weight percent of said second copolymer.

43. A film, as defined in claim 9, wherein said copolymer of propylene and ethylene having at least 80 weight percent of its polymer units derived from propylene is present in said core layer is an amount between about 2 to 15 weight percent of said core layer.

44. A film, as defined in claim 9, wherein said copolymer of propylene and ethylene, having at least 80 weight percent of its polymer units derived from propylene, has a melting point of at least 130° C.

45. A film, as defined in claim 10, wherein said copolymer of propylene and ethylene, having at least 80 weight percent of its polymer units derived from propylene, has a melting point of at least 130° C.

46. A film, as defined in claim 1, wherein said copolymer of said core layer has a melting point at least 30° C. greater than the melting point of (i) any polymer or combination of polymers in said first outer layer which polymer or combination of polymers comprise at least 80 weight percent of said first outer layer, and (ii) any polymer or combination of polymers in said second outer layer which polymer or combination of polymers comprises at least 80 weight percent of said second outer layer.

47. A film, as defined in claim 1, wherein said copolymer of said first outer layer has a melting point at least 30° C. greater than the melting point of (i) any polymer or combination of polymers in said first core layer which polymer or combination of polymers comprise at least 80 weight percent of said core layer, and (ii) any polymer or combination of polymers in said second outer layer which polymer or combination of polymers comprises at least 80 weight percent of said second outer layer.

48. A film, as defined in claim 1, wherein said copolymer of said core layer has a melting point greater than 110° C.

49. A film, as defined in claim 1, wherein said copolymer of said first outer layer has a melting point greater than 110° C.

50. A film, as defined in claim 20, wherein said copolymer having a melting point of at least 90° C. of said first outer layer has a melting point greater than 110° C.

51. A film, as defined in claim 21, wherein said copolymer having a melting point of at least 90° C. of said core layer has a melting point greater than 110° C.

52. A film, as defined in claim 1, wherein said copolymer of said first outer layer has a melting point between about 90° to 110° C.

53. A film, as defined in claim 1, wherein said copolymer of said core layer has a melting point between about 90° to 110° C.

54. A film, as defined in claim 1, wherein said first copolymer of said second outer layer has a melting point between about 90° and 95° C.

55. A film, as defined in claim 1, wherein said second copolymer of said second outer layer has a melting point which is $\geq 50°$ C. and $\leq 80°$ C.

56. A film, as defined in claim 1, wherein said film is poly(vinyl chloride) free and has a permanent deformation of less than 5.0 percent in both machine and transverse directions.

57. A film, as defined in claim 1, wherein said film is poly(vinyl chloride) free and has a permanent deformation of less than 4.0 percent in at least one direction.

58. A film, as defined in claim 1, wherein said first outer layer further comprises an antifog agent in an amount up to 4 weight percent of said layer.

59. A film, as defined in claim 1, wherein said core layer further comprises an antifog agent in an amount up to 4 weight percent of said layer.

60. A film, as defined in claim 1, wherein both said first outer layer and said core layer each further comprise an antifog agent in an amount up to 4 weight percent based upon each respective layer weight.

61. A film, as defined in claim 1, wherein said antifog agent comprises a nonionic surfactant in a polyolefin carrier.

62. A film, as defined in claim 1, wherein said first outer layer consists essentially of said copolymer blended with, from 0 to 10% by layer weight of an antifog agent and from 0 to 10% by layer weight of a slip agent.

63. A film, as defined in claim 1, wherein said first and second outer layers each further comprise a slip agent blended therein.

64. A film, as defined in claim 1, wherein said film has a haze of less than 5.0 percent.

65. A film, as defined in claim 1, wherein said film has a haze of less than 3.0 percent.

66. A film, as defined in claim 1, wherein said film has a gloss at 45° of at least 70 Hunter units.

67. A film, as defined in claim 1, wherein said film has a gloss at 45° that is greater than 80 Hunter units.

68. A film, as defined in claim 1, wherein said film has a hot bar heat sealing range of at least 16° C. with a burn through temperature of at least 125° C.

69. A film, as defined in claim 1, which is irradiatively crosslinked.

70. A film, as defined in claim 1, which is substantially uncrosslinked.

71. A polyolefin, multilayer flexible film having at least three layers comprising:

a first outer layer comprising at least one copolymer of ethylene and at least one $C_4$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point between 85° to 125° C.;

a core layer comprising at least one copolymer of ethylene and at least one $C_4$–$C_8$ alpha-olefin, said copolymer having at least 75 weight percent of its polymer units derived from ethylene, and said copolymer having a density below 0.900 g/cm$^3$, and a melting point of less than about 80° C.; and a second outer layer comprising a copolymer of ethylene and at least one $C_3$–$C_8$ alpha-olefin, said copolymer having at least 75 weight percent of its polymer units derived from ethylene, and said copolymer having a density below 0.915 g/cm$^3$, and a melting point between 85°–125° C. wherein said core layer is disposed between said first and second outer layers and said multilayer film has less than 10% unrestrained shrinkage at 90° C. in at least one direction.

72. A film, as defined in claim 71, wherein said melting point of said copolymer in said first outer layer, and said copolymer in said second outer layer is between 85 to 110° C.

73. A polyolefin, multilayer flexible film having at least three layers comprising:

a first outer layer comprising at least one copolymer of ethylene and at least one $C_4$–$C_8$ alpha-olefin, said copolymer having at least 75 weight percent of its polymer units derived from ethylene, and said copolymer having a density below 0.900 g/cm$^3$, and a melting point of less than about 80° C.;

a core layer comprising at least one copolymer of ethylene and at least one $C_4$–$C_8$ alpha-olefin, said copolymer having at least 75 weight percent of its polymer units derived from ethylene, and said copolymer having a density of at least about 0.900 g/cm$^3$ and below 0.915 g/cm$^3$, and a melting point between 85° to 125° C.;

a second outer layer comprising a copolymer of ethylene and at least one $C_3$–$C_8$ alpha-olefin, said copolymer having at least 75 weight percent of its polymer units derived from ethylene, and said copolymer having a density below 0.915 g/cm$^3$, and a melting point between 85°–125° C. wherein said core layer is disposed between said first and second outer layers and said multilayer film has less than 10% unrestrained shrinkage at 90° C. in at least one direction.

74. A film, as defined in claim 73, wherein said melting point of said copolymer in said core layer, and said copolymer in said second outer layer is between 85° to 110° C.

75. A polyolefin flexible film comprising a blend of:

(a) a copolymer of ethylene and at least one $C_3$–$C_8$ alpha-olefin, said copolymer (a) having at least 75 weight percent of its polymer units derived from ethylene, and said copolymer (a) having a melting point of at least 90° C. and a density of at least about 0.900 g/cm$^3$ and below 0.915 g/cms;

(b) a copolymer of ethylene and at least one $C_3$–$C_8$ alpha-olefin, said copolymer (b) having at least 75 weight percent of its polymer units derived from ethylene, and said copolymer (b) having a melting point less than about 80° C. and having a density less than 0.900 g/cm$^3$ and greater than 0.860 g/cma; and (c) a copolymer of propylene and ethylene having at least 80 weight percent of its polymer units derived from propylene.

76. A film, as defined in claim 75, wherein said film is a blown film, and wherein said blend comprises at least 50% by weight of said copolymer (a) which is an ethylene octene-1 copolymer, at least 10% by weight of said copolymer (b) which has a molecular weight distribution less than 3, and at least 10% by weight of said copolymer (c) which has a melting point of at least 130° C.; and wherein said film further comprises from 0–10% by weight of a nonionic surfactant and 0–10% by weight of a slip agent.

* * * * *